United States Patent
Horiike et al.

[11] Patent Number: 5,844,618
[45] Date of Patent: Dec. 1, 1998

[54] METHOD AND APPARATUS FOR TELECINE IMAGE CONVERSION

[75] Inventors: Kazuyoshi Horiike, Kyoto; Makoto Hagai, Nara, both of Japan

[73] Assignee: Matsushita Electric Industrial Co., Ltd., Osaka-fu, Japan

[21] Appl. No.: 600,584

[22] Filed: Feb. 13, 1996

[30] Foreign Application Priority Data

Feb. 15, 1995 [JP] Japan ................................. 7-051857

[51] Int. Cl.⁶ .......................... H04N 7/01; H04N 11/20
[52] U.S. Cl. ............................................. 348/441; 348/459
[58] Field of Search .................................. 348/441, 443, 348/459, 97, 911; H04N 7/01

[56] References Cited

U.S. PATENT DOCUMENTS

| | | |
|---|---|---|
| 5,317,398 | 5/1994 | Casavant et al. |
| 5,452,011 | 9/1995 | Martin et al. ............................ 348/459 |
| 5,517,248 | 5/1996 | Isoda ..................................... 348/459 |
| 5,600,376 | 2/1997 | Casavant et al. ....................... 348/423 |
| 5,606,373 | 2/1997 | Dopp et al. ............................ 348/459 |
| 5,691,771 | 11/1997 | Oishi et al. ............................ 348/97 |

FOREIGN PATENT DOCUMENTS

| | | |
|---|---|---|
| 5-183807 | 7/1993 | Japan . |
| 6-233182 | 8/1994 | Japan . |
| 7-107375 | 4/1995 | Japan . |

*Primary Examiner*—Michael Lee
*Attorney, Agent, or Firm*—Panitch Schwarze Jacobs & Nadel, P.C.

[57] ABSTRACT

An input telecine image is held by a field memory, and correlation values of respective images in a first field and a second field are calculated by correlation value calculation circuits. The correlation values are compared with a predetermined threshold value, and when the correlation value is smaller than the threshold value, a duplicated field is determined. Moreover, the correlation values of the first and second fields are compared in the correlation value comparison circuits, and the duplicated fields are determined. These information are held by a phase holding circuit. A phase pattern of a successive images converted by a 3:2 pulldown method is searched by a phase synchronization circuit on the basis of the information of phase obtained by the phase holding circuit. A control unit inversely converts automatically the telecine image including successive images converted by a method different from the 3:2 pulldown method to a film image.

38 Claims, 19 Drawing Sheets

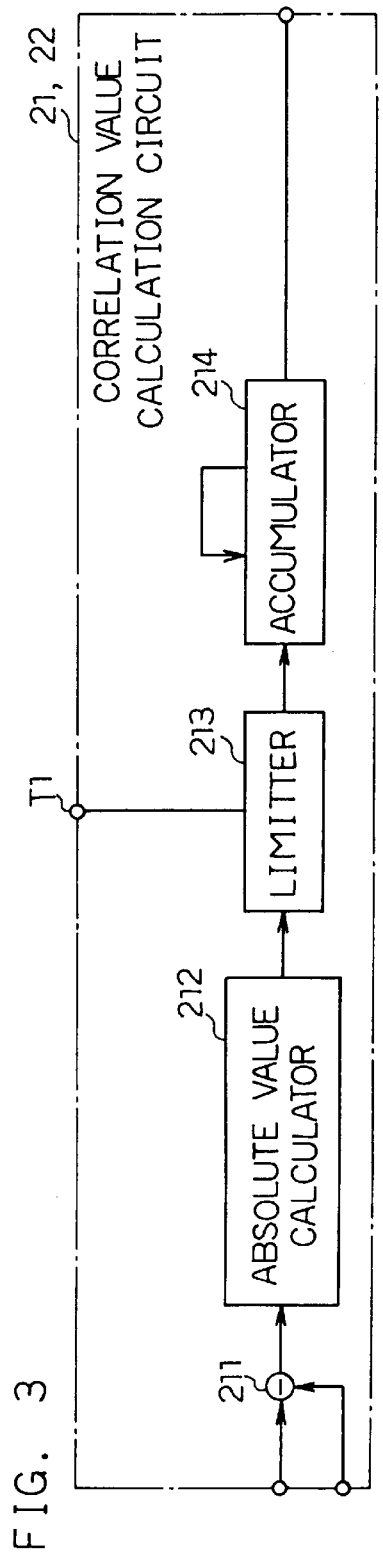
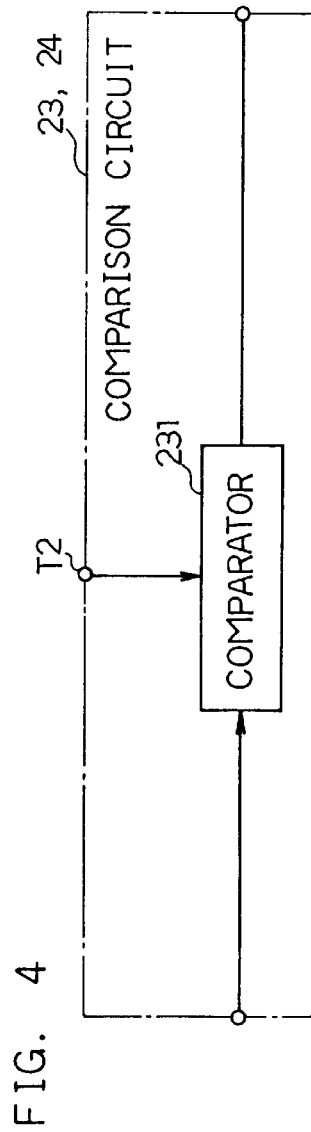
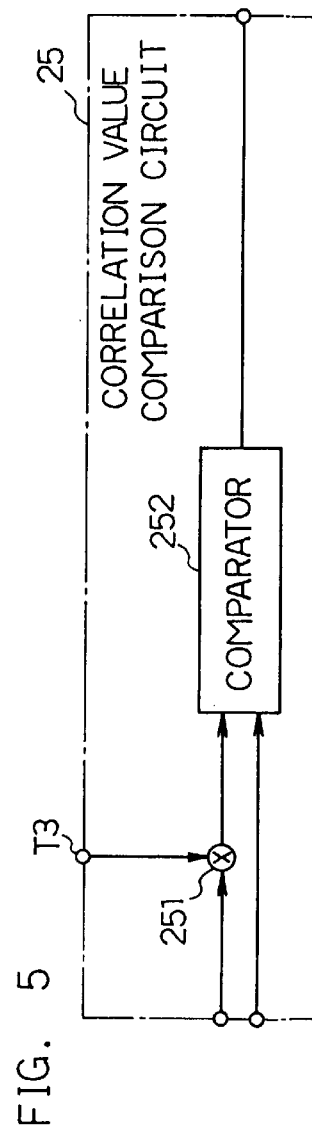
FIG. 3
FIG. 4
FIG. 5

METHOD AND APPARATUS FOR TELECINE IMAGE CONVERSION

FIELD OF THE INVENTION AND RELATED ART STATEMENT

1. Field of the Invention

The present invention relates to a method and an apparatus for telecine image conversion for inversely converting a telecine image to a film image.

2. Description of the Related Art

In the NTSC standard which is a current broadcasting standard of the television, an image is displayed by interlace scanning at 29.97 Hz of frame frequency. On the other hand, an ordinary film picture is displayed at 24 Hz of frame frequency. Therefore, in order to broadcast the film picture such as a movie by the television, the image of the frame frequency 24 Hz of the film picture must be converted to a television image of the frame frequency 29.97 Hz called a "telecine image".

In this image conversion, a 3:2 pulldown method is most widely utilized. FIG. 21 is an illustration of principle of the conversion from the film image of the frame frequency 24 Hz to the telecine image of the frame frequency 30 Hz by the 3:2 pulldown method. Incidentally, the frame frequency 30 Hz is converted to 29.97 Hz by a known method. Referring to FIG. 21, each frame image F1, F2, F3 or F4 of the film image is divided into two field images f1 and f2. For example, a field 14 of the telecine image illustrated with hatches is a duplication from a field 11 of the film image F2, and has the same image as the image of a field 13. In a similar manner, a field 16 of the telecine image is a duplication of a field 12 of the film image F4, and has the same image as the image of a field 15. Conversion as mentioned above is duplicated every four frames of the film image, and five frames of the telecine image of frame frequency 30 Hz are produced per four frames of the film image of the frame frequency 24 Hz.

Every ten fields repetition duplicated as shown in FIG. 21 at a period of five frames is a feature of the telecine image produced by the 3:2 pulldown method. Hereinafter, an arrangement of the duplicated fields in a time series is defined as a "phase", and the phase of the duplicated images of the telecine image produced by conversion of the 3:2 pulldown method is called a "phase of the 3:2 pulldown method". On the other hand, a phase which does not conform to the phase of the 3:2 pulldown method is called "an irregular phase". Hereinafter, an "image" in the description represents a video image formed by a video signal.

From the view point of coding of the image, the telecine image obtained by the above-mentioned method has a high redundancy of time and is not suitable for the coding, because plural images produced from the same field of a film image are included. In coding of the telecine image, it is required to reduce the redundancy in time in advance.

In order to reduce the redundancy of time, it is effective to inversely convert the telecine image to an original film image of the frame frequency 24 Hz. For this purpose, it must be detected whether the telecine image signal is converted by the 3:2 pulldown method or not.

A detection method of the telecine image in the prior art is described hereafter. As shown in FIG. 21, the image of a duplicated field is the same as the image of the field at the same position of the previous frame in time in the conversion by the 3:2 pulldown method. Then, for example, the image of the field 13 is identical with that of the field 14, and the image of the field 15 is identical with the field 16. Therefore, when a difference is calculated between respective luminances of two images, the difference should be zero. The difference between the respective luminances of the images of two fields is defined as a "field difference". A detection method of the telecine image in the prior art is disclosed in the U.S. Pat. No. 5,317,398, for example. According to the patent, it is determined whether an input image is an ordinary telecine image or not by the field difference.

SUMMARY OF THE INVENTION

An object of the present invention is to provide a method and an apparatus for telecine image conversion which are not influenced by noise in an image signal of a field, and can inversely convert a telecine image including an irregular phase.

In the present invention, a time-successive signal of a telecine image is inputted, and with respect to a first field and a second field, the absolute value of a difference between a pixel value defined as the luminance of an image in the field of the telecine image and a pixel value defined as the luminance of an image in the field preceeding by one frame period is calculated. Then, a correlation value of the first field and a correlation value of the second field are calculated by summing the respective absolute values. When the correlation value of the first field is smaller than a predetermined reference value, or when a relative value of the correlation value of the first field with respect to the correlation value of the second field in the same frame exceeds the reference value, the image of the first field is determined as an image of a duplicated field. Moreover, when the correlation value of the second field is smaller than a predetermined reference value, or when a relative value of the correlation value of the first field with respect to the correlation value of the second field in the same frame exceeds the reference value, the image of the second field is determined as an image of the duplicated field. Finally, the duplicated field is used as a reference field and thereby the telecine image is inversely converted to a film image.

BRIEF DESCRIPTION OF THE DRAWINGS

FIG. 3 is a detailed block diagram of a correlation value calculation circuit in FIG. 1;

FIG. 4 is a detailed block diagram of a comparison circuit in FIG. 1;

FIG. 5 is a detailed block diagram of a correlation value comparison circuit in FIG. 1;

DESCRIPTION OF THE PREFERRED EMBODIMENT

The present invention will be described below in detail with reference to the accompanying drawings.

[First Embodiment]

Figure 1:
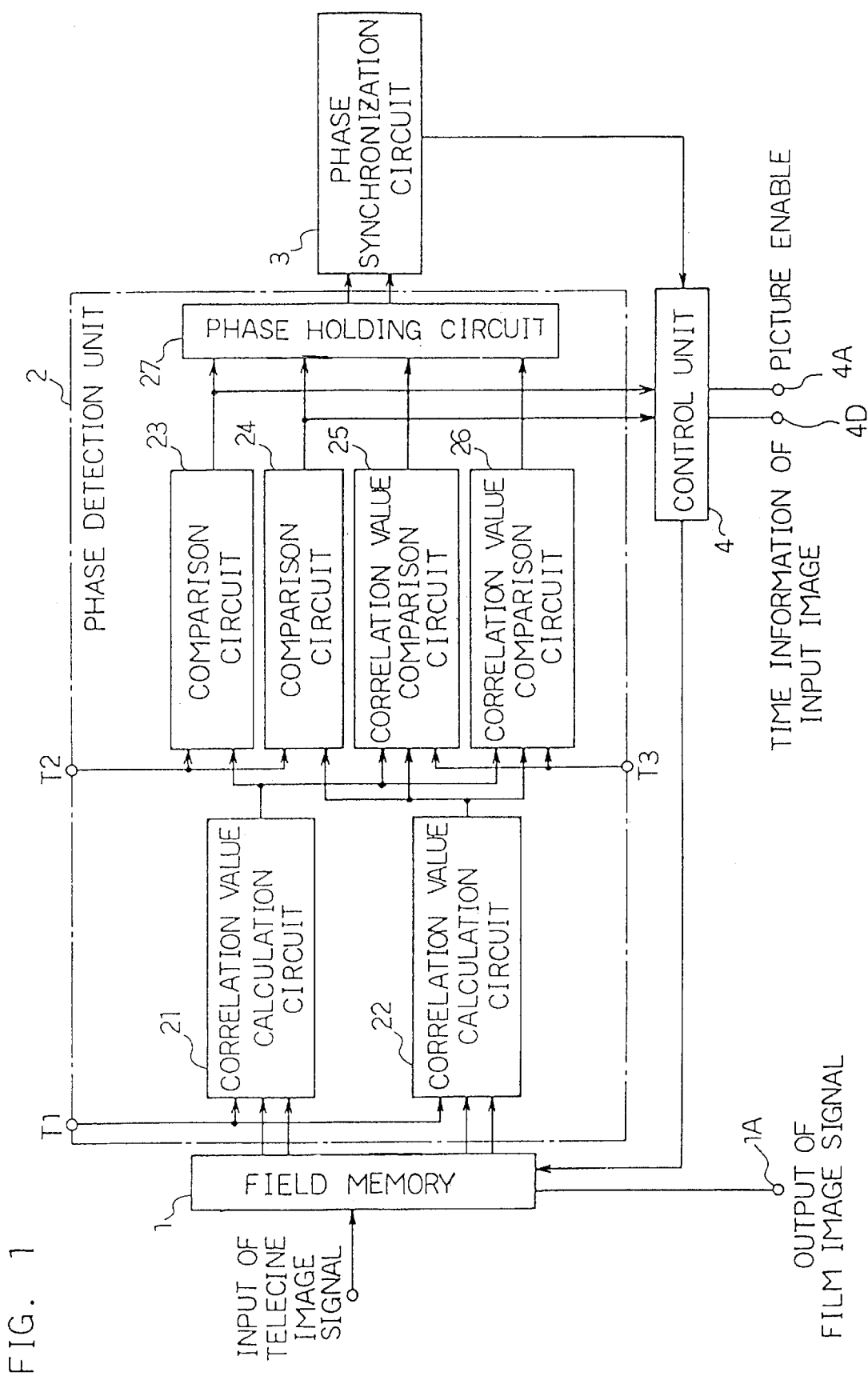
FIG. 1 is a block diagram of a first embodiment of a telecine image conversion apparatus in accordance with the present invention.

A telecine image conversion method and apparatus of a first embodiment of the present invention are described hereafter with reference to FIGS.1–15. FIG. 1 is a block diagram of the telecine image conversion apparatus of the first embodiment. Referring to FIG. 1, a field memory 1 is a memory for storing an inputted telecine image signal of first fields and second fields in plural frames. A phase detection unit 2 enclosed by a chain line is a block to detect a "phase of field" in the telecine image signal. The phase detection unit 2 comprises correlation value calculation circuits 21 and 22, comparison circuits 23 and 24, correlation value comparison circuits 25 and 26 and a phase holding circuit 27.

Figure 20:
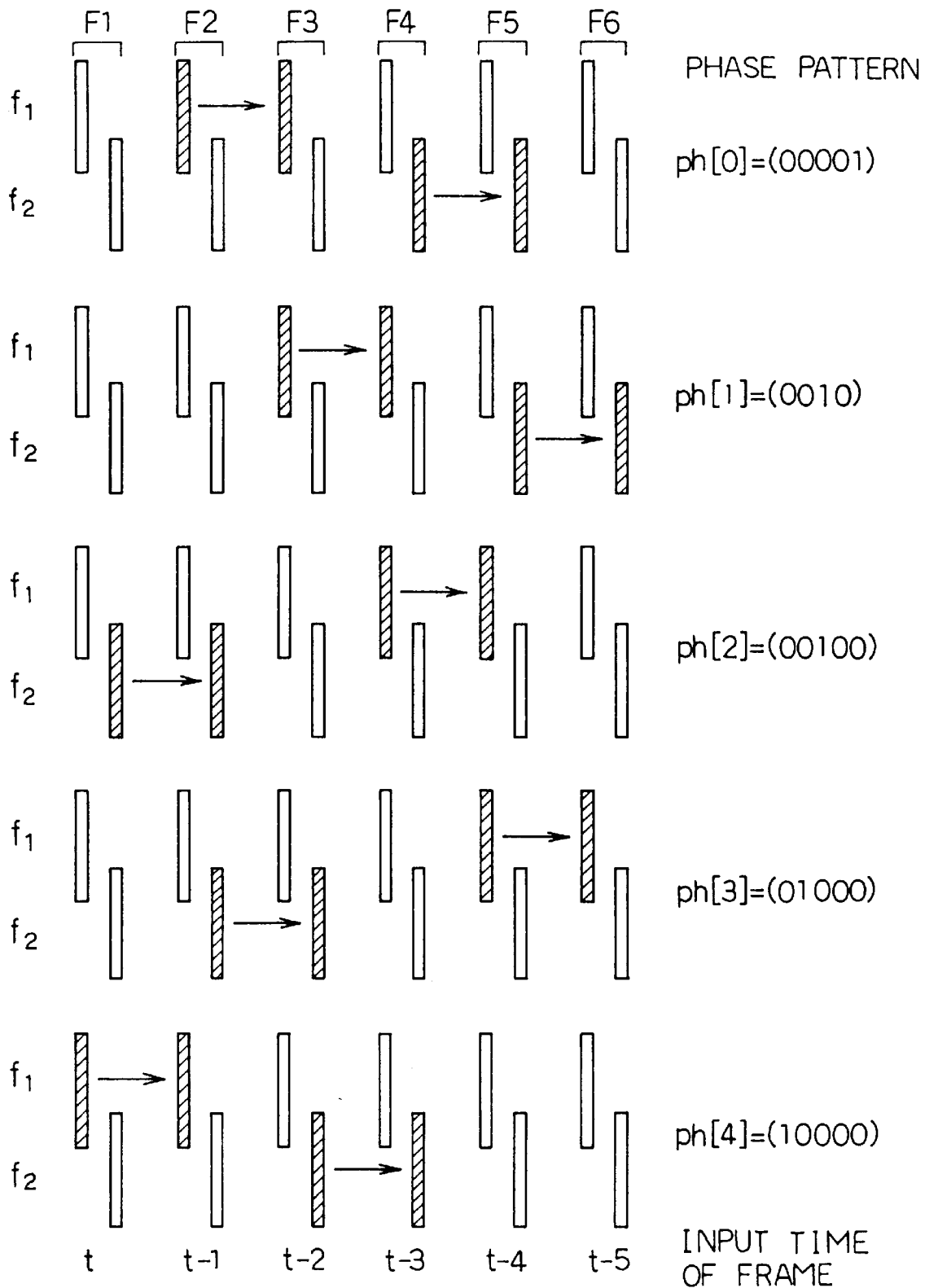
FIG. 20 is the illustration of all phase patterns in the ordinary 3:2 pulldown method.
Figure 21:
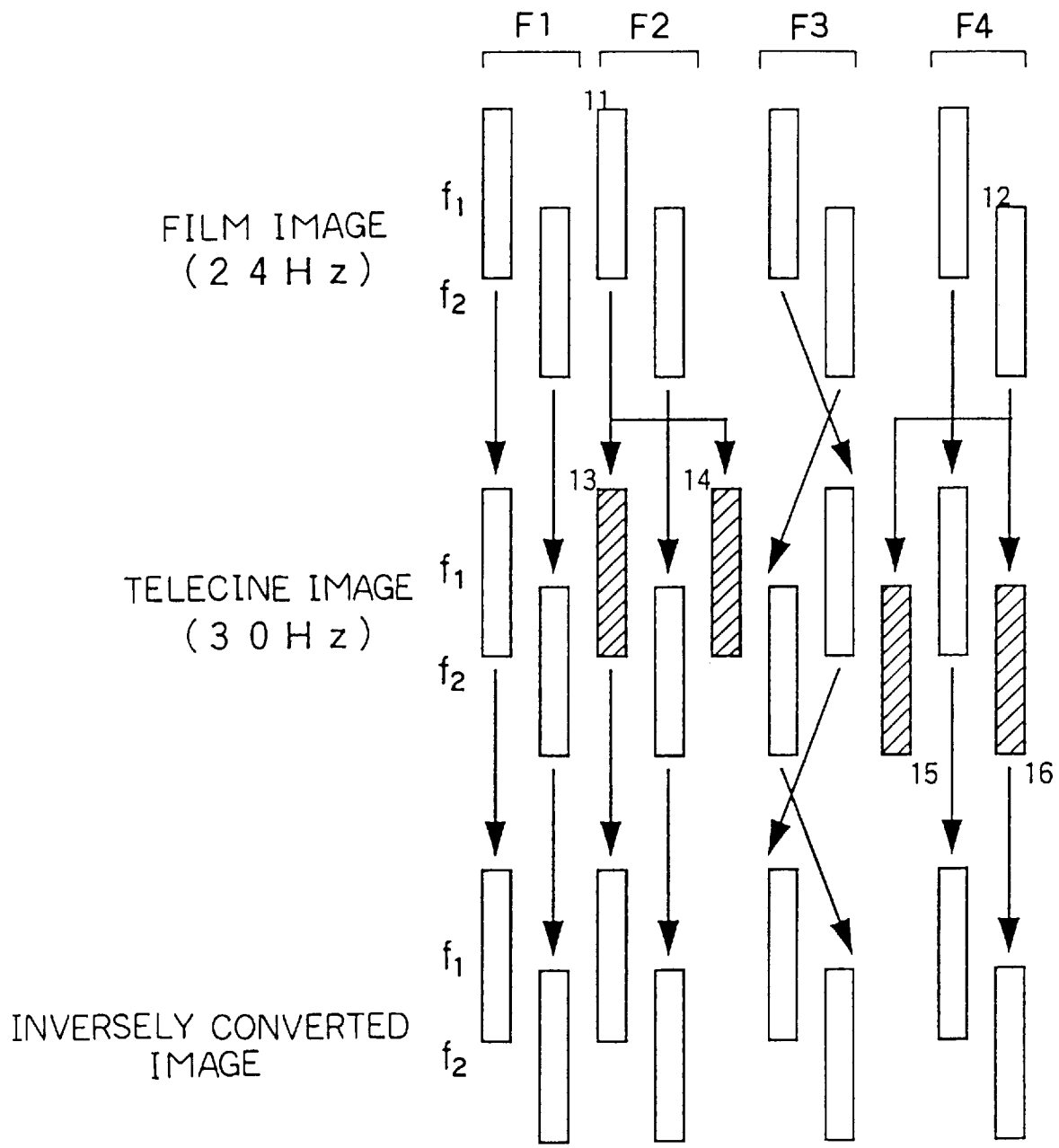
FIG. 21 is the illustration of principle of the conversion from the film image of the frame frequency 24 Hz to the telecine image of the frame frequency 30 Hz by the 3:2 pulldown method in the prior art.

The "phase of field" is described. In successive frames of the telecine image, arrangement of the duplicated fields changes periodically. In a field group in one period of the change of the arrangement, an arrangement of fields which is determined by positions of the duplicated fields is defined as a "phase pattern". Provided that one of the phase patterns is selected to a reference phase pattern, shift of the phase pattern from the reference phase pattern is defined as the "phase of field". Five phase patterns exist as shown in FIG. 20, and are represented by ph[0]–ph[4].

In the correlation value calculation circuit 21, the absolute value of a difference between two pixel values represented by respective luminances of a pixel at a position of a first field of present frame and a pixel at the same position of a first field of the previous frame in the telecine image is calculated from the image signal stored in the field memory 1. The absolute values with respect to entire pixels of the first fields are summed and a correlation value of the first fields in the telecine image is output. In a similar manner, in the correlation value calculation circuit 22, a correlation value of the second field is attained from the pixel values of the second field of the present frame and the pixel values of the second field of the previous frame. In the comparison circuit 23, the correlation value output from the correlation value calculation circuit 21 is compared with a predetermined reference value. When the correlation value is smaller than the reference value, it is determined that the image of the first field is that of a duplicated field. In a similar manner, in the comparison circuit 24, the correlation value output from the correlation value calculation circuit 22 is compared with the reference value, and when the correlation value is smaller than the reference value, it is determined that the image of the second field is that of a duplicated field.

In the correlation value comparison circuit 25, the correlation values output from the correlation value calculation circuits 21 and 22 are compared with each other. When a "relative value" defined as a ratio of the correlation value of the second field to the correlation value of the first field in the same frame exceeds a reference value, it is determined that the image of the first field is that of a duplicated frame. In a similar manner, in the correlation value comparison circuit 26, the correlation value output from the correlation value calculation circuits 21 and 22 are compared with each other. When a relative value defined as a ratio of the correlation value of the first field to the correlation value of the second field exceeds a reference value, it is determined that the image of the second field is that of a duplicated field.

In the phase holding circuit 27, a logical sum of the output of the comparison circuit 23 and the output of the correlation value comparison circuit 25 is held as determination result representing whether the first field is the duplicated field or not. Furthermore, a logical sum of the output of the comparison circuit 24 and the output of the correlation value comparison circuit 26 is held as determination result representing whether the second field is the duplicated field or not. Moreover, all phase patterns which coincide with predetermined phase patterns are detected from appearing phase patterns of the determination results determined as the duplicated field in the held determination result representing whether the first field is duplication field or not and the held determination result representing whether the second field is the duplication field or not. Consequently, a logical sum of data corresponding to detected respective phase patterns is output as phase information.

In the phase synchronization circuit 3, a head field and a phase of the head field in the successive fields having the period of conversion by the 3:2 pulldown method are detected from the successive fields of the inputted telecine image on the basis of the detection result of the phase detection unit 2.

The control unit 4 comprises a CPU, and thereby input of the telecine image to the field memory 1 is controlled. Moreover, the image signal in the field memory 1 is read out on the basis of the phase information of the phase synchronization circuits 3 by control of the control unit 4.

Figure 2:
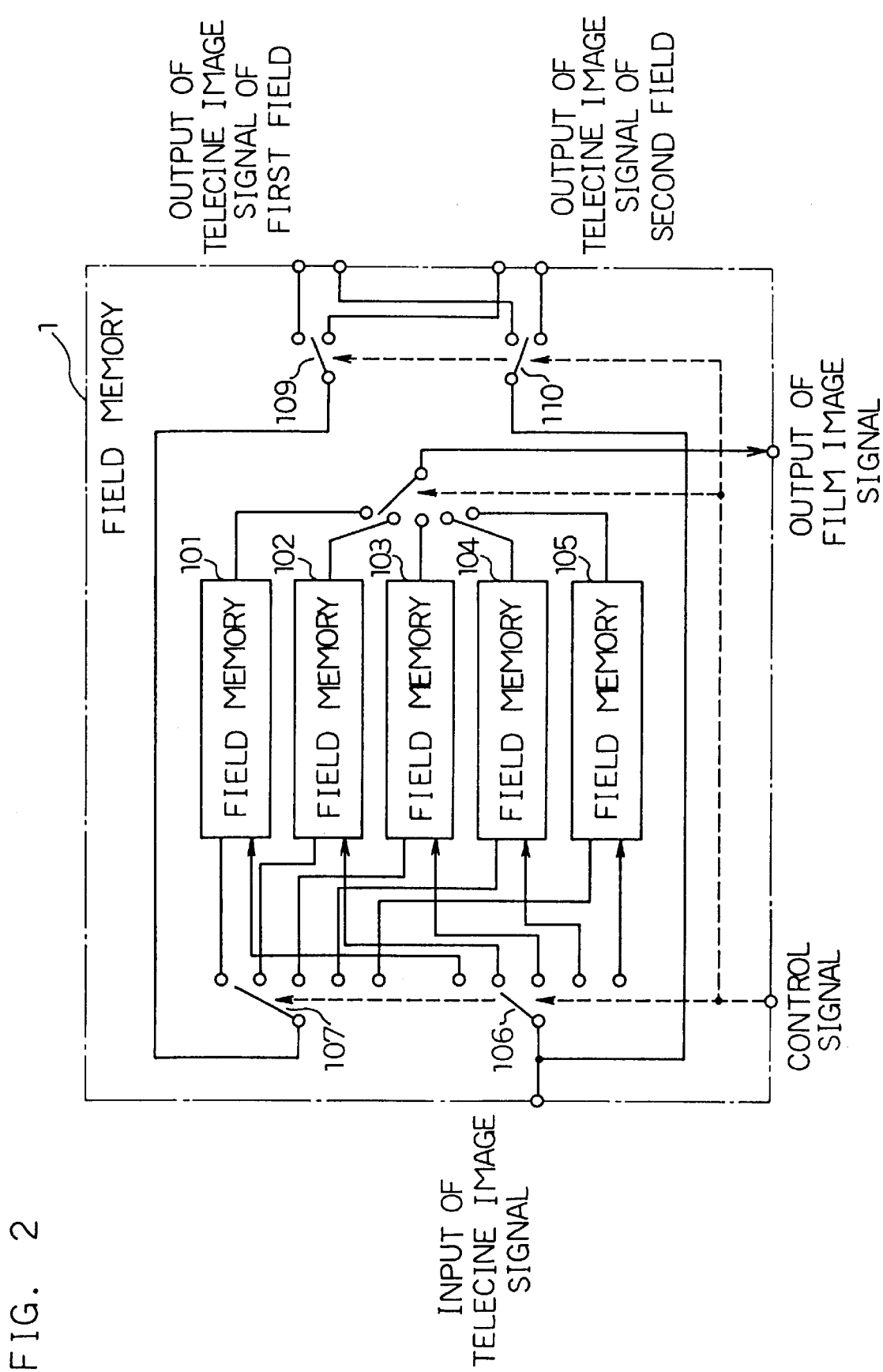
FIG. 2 is a detailed block diagram of a field memory in FIG. 1.

Detailed configuration of each circuit in FIG. 1 is described hereafter. As shown in FIG. 2, the field memory 1 comprises field memories 101, 102, 103, 104 and 105 for each storing one field image signal, and five switches 106, 107, 108, 109 and 110 for controlling input to and output from the field memories 101–105 by the control signal of the control unit 4.

As shown in FIG. 3, the correlation value calculation circuits 21 and 22 comprises a subtractor 211 for deriving a difference between respective luminances of input images of two fields, an absolute value calculator 212 for attaining a positive value of the difference, a limiter 213 for outputting a logical "zero" when the absolute value of the difference is a predetermined threshold value T1 and below, and an accumulator 214 for summing the outputs of the limiter 213 every field.

The comparison circuit 23 comprises one comparator 231 as shown in FIG. 4, and an output value of the correlation value calculation circuit 21 is compared with a predetermined threshold value T2. Consequently, when the output value is smaller than the threshold value T2, a logical "one" is output. On the other hand, when the output value is the threshold value T2 or more, a logical "zero" is output. In a similar manner, the comparison circuit 24 comprises one comparator 231, and the output value of the correlation value calculation circuit 22 is compared with the threshold value T2. Consequently, when the output value is smaller than the threshold value T2, the logical "one" is output. On the other hand, the output value is the thereshhold value T2 or more, the logical "zero" is output.

The correlation value comparison circuit 25, as shown in FIG. 5, comprises a multiplier 251 and a comparator 252, and a predetermined coefficient T3 is multiplied to the output value of the correlation value calculation circuit 21. Consequently, when the output value of multiplication result is equal to the output value and below of the correlation value comparison circuit 22, the logical "one" is output. On the other hand, when the output value of multiplication result is larger than the output of the correlation value comparison circuit 22, the logical "zero" is output. In a similar manner, in the correlation value comparison circuit 22, the coefficient T3 is multiplied to the output value of the correlation value calculation circuit 22. Consequently, when the output value of multiplication result is equal to the output value and below of the correlation value comparison circuit 21, the logical "one" is output. On the other hand, when the output value of multiplication result is larger than the output value of the correlation value comparison circuit 21, the logical "zero" is output.

Figure 6:
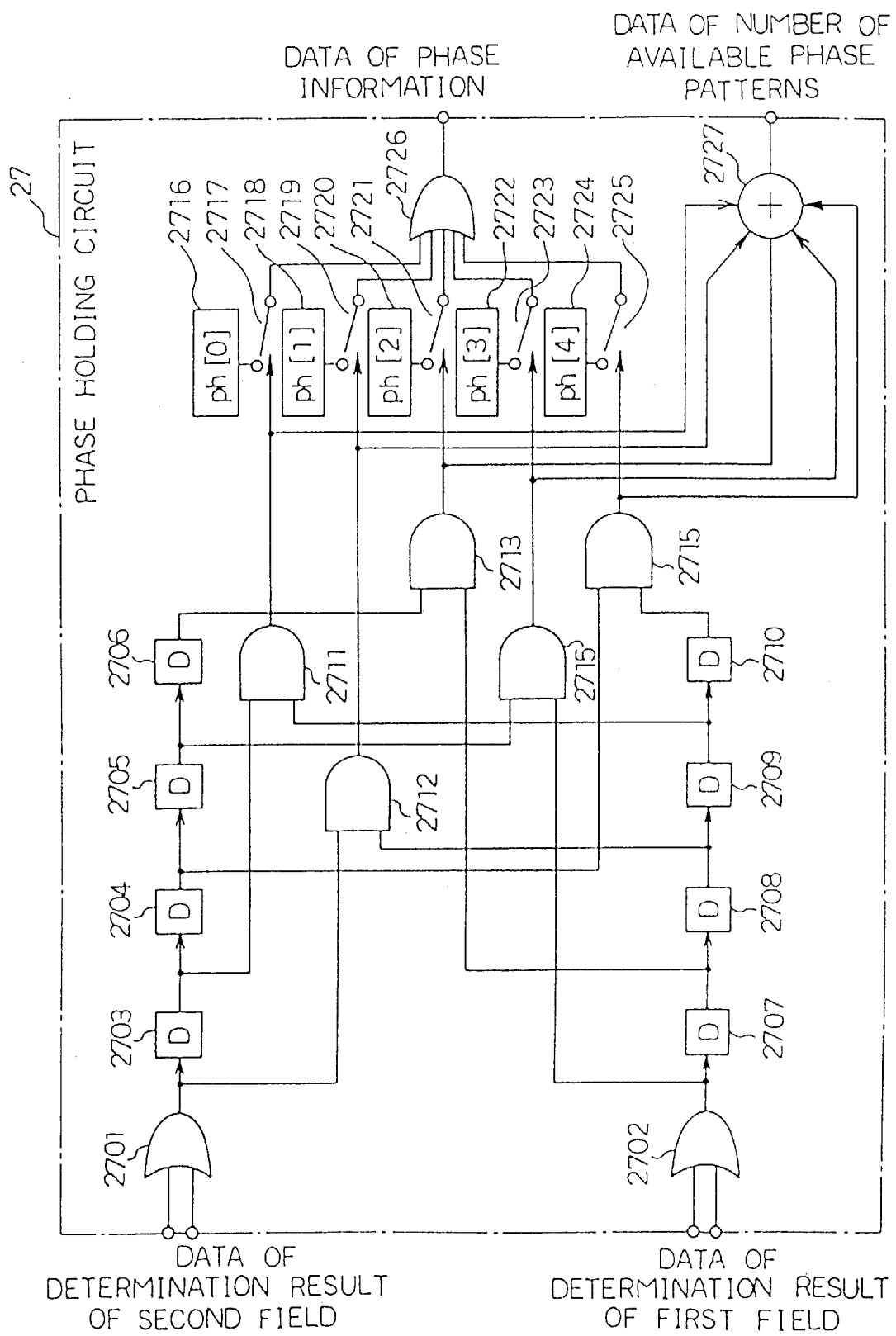
FIG. 6 is a detailed block diagram of a phase holding circuit in FIG. 1.

As shown in FIG. 6, the phase holding circuit 27 comprises an OR circuit 2701 for attaining a logical sum of a comparison result of the comparison circuit 24 and a comparison result of the correlation value comparison circuit 26, a delay circuit 2703 for delaying the output of the OR circuit 2701 by one frame period, a delay circuit 2704 for delaying the output of the delay circuit 2703 by one frame period, a delay circuit 2705 for delaying the output of the delay circuit 2704 by one frame period and a delay circuit 2706 for delaying the output of the delay circuit 2705 by one frame period.

The phase holding circuit 27 comprises an OR circuit 2702 for attaining a logical sum of a comparison result of the comparison circuit 23 and a comparison result of the correlation value comparison circuit 25, a delay circuit 2707 for delaying the output of the OR circuit 2702 by one frame period, a delay circuit 2708 for delaying the output of the delay circuit 2707 by one frame period, a delay circuit 2709 for delaying the output of the delay circuit 2708 by one frame period and a delay circuit 2710 for delaying the output of the delay circuit 2709 by one frame period.

The phase holding circuit 27 comprises an AND circuit 2714 for attaining a logical product of the output of the OR circuit 2702 and the output of the delay circuit 2705, an AND circuit 2713 for attaining a logical product of the output of the delay circuit 2707 and the output of the delay circuit 2706, an AND circuit 2712 for attaining a logical product of the output of the delay circuit 2708 and the output of the OR circuit 2701, an AND circuit 2711 for attaining a logical product of the output of the delay circuit 2709 and the output of the delay circuit 2703 and an AND circuit 2715 for attaining a logical product of the output of the delay circuit 2710 and the output of the delay circuit 2704.

The phase holding circuit 27 comprises a switch 2717 for controlling the output of a phase pattern memory 2716 by the output of the AND circuit 2711, a switch 2719 for controlling the output of the phase pattern memory 2718 by the output of the AND circuit 2712, a switch 2721 for controlling the output of a phase pattern memory 2720 by the output of the AND circuit 2713, a switch 2723 for controlling the output of a phase pattern memory 2722 by the output of the AND circuit 2714, a switch 2725 for controlling the output of a phase pattern memory 2724 by the output of the AND circuit 2715 and an OR circuit 2726 for attaining a logical sum of five outputs of the switches 2717, 2719, 2721, 2723 and 2725.

The phase holding circuit 27 comprises an adder 2727 for summing the output of the AND circuit 2715, the output of the AND circuit 2711, the output of the AND circuit 2712, the output of the AND circuit 2713 and the output of the AND circuit 2714.

Figure 7:
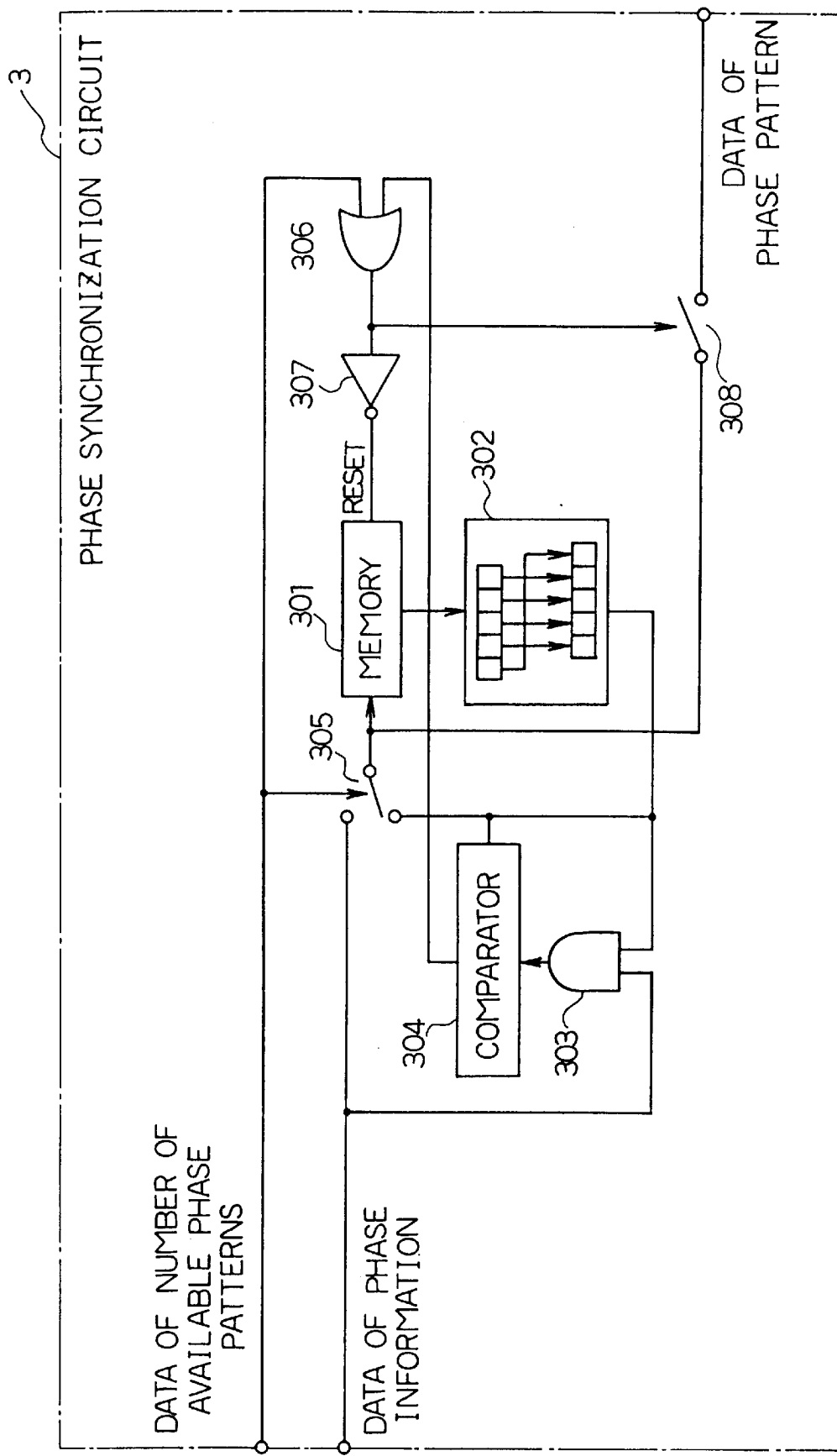
FIG. 7 is a detailed block diagram of a phase synchronization circuit in FIG. 1.
Figure 8:
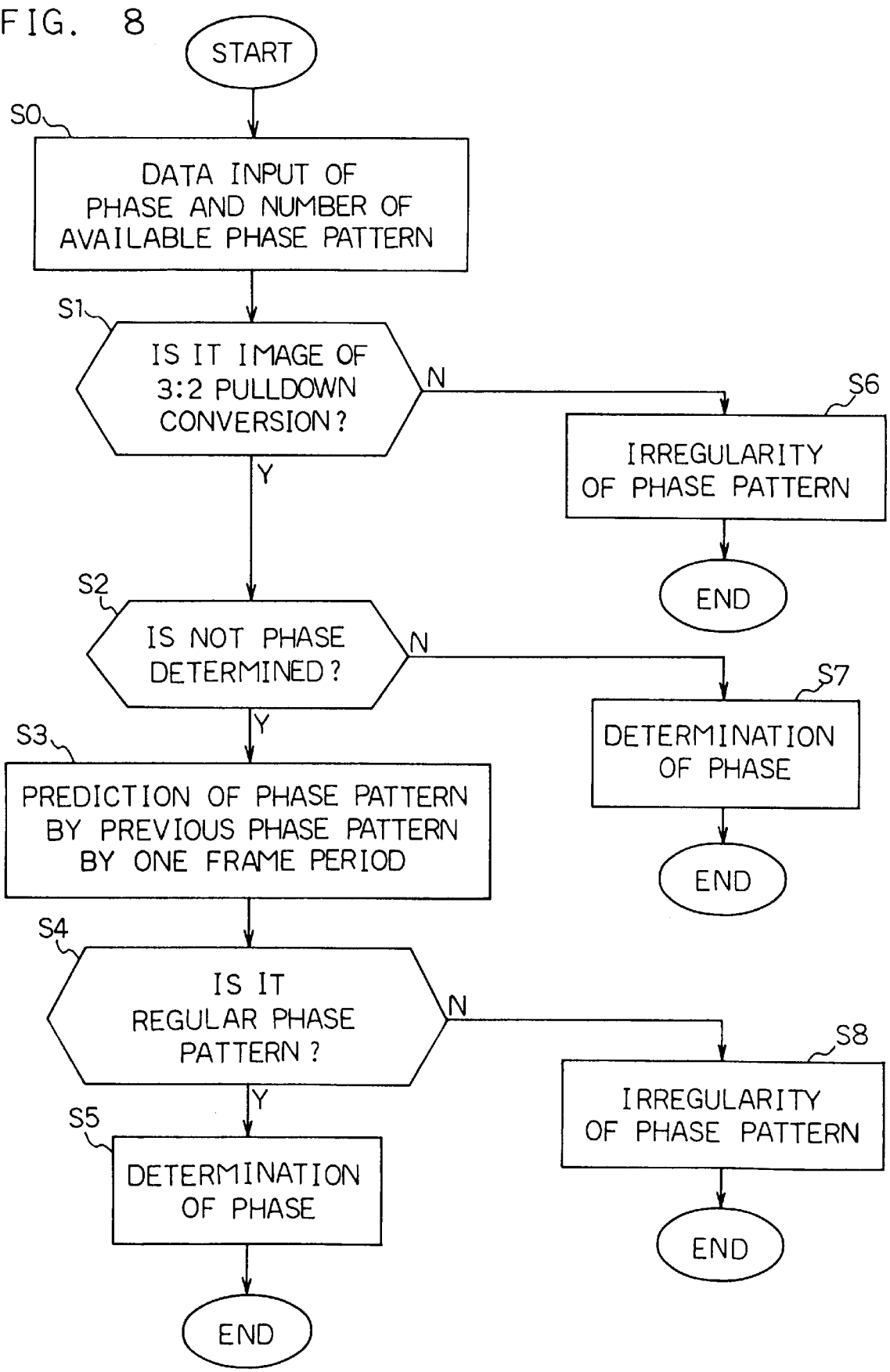
FIG. 8 is a flowchart of an algorithm of phase synchronization.

As shown in FIG. 7, the phase synchronization circuit 3 comprises a memory 301 for holding phase information of a previous field of one frame period, a phase information renewal circuit 302 for advancing the phase information stored in the memory 301 by one frame period, an AND circuit 303 for attaining a logical product of the output of the phase information renewal circuit 302 and the phase information output from the phase holding circuit 27 and a comparator 304 for comparing the output of the AND circuit 303 with the output of the phase information renewal circuit 302.

The phase synchronization circuit 3 comprises an OR circuit 306 for summing the comparison result of the comparator 304 and phase determination information output from the phase holding circuit 27, a switch 305 for controlling the phase determination information for inputting the phase information output from the phase holding circuit 27 or the output of the phase information renewal circuit 302 in compliance with the phase determination information and a switch 308 for connecting or disconnecting the output of the phase determination information to the control unit 4 by the output of the OR circuit 306. The control unit 4 comprises the CPU, and controls input to and output from the field memory 1 from the output of the phase synchronization circuit 3, the comparison result of the comparison circuit 23 and the comparison result of the comparison circuit 24.

Operation of the telecine image conversion apparatus of the first embodiment is described with reference to FIG. 1. Referring to FIG. 1, an inputted telecine image signal is stored in the field memory 1 by input control of the control unit 4 (step S20 in FIG. 19). In the correlation value calculation circuits 21 and 22, correlation values which are references for determining a duplicated field are calculated from the image signal stored in the field memory 1 (step S21).

First, a correlation value cov1(t) of the first field and a correlation value cov2(t) of the second field of a frame at a time t are defined as equations (1) and (2), respectively.

$$cov1(t) = \sum_{Field1} e(t) \qquad (1)$$

where $$e(t) = \begin{cases} 0; & |f1(t, h, v) - f1(t-1, h, v)| \leq T1 \\ |f1(t, h, v) - f1(t-1, h, v)|; & |f1(t, h, v) - f1(t-1, h, v)| > T1 \end{cases}$$

$$cov2(t) = \sum_{Field2} e(t) \qquad (2)$$

where $$e(t) = \begin{cases} 0; & |f2(t, h, v) - f2(t-1, h, v)| \leq T1 \\ |f2(t, h, v) - f2(t-1, h, v)|; & |f2(t, h, v) - f2(t-1, h, v)| > T1 \end{cases}$$

Where, a representation f1(t,v,h) in equation (1) represents a pixel value showing a luminance of a pixel at a vertical position v and a horizontal position h in the first field of the frame at the time t. In a similar manner, a representation f2(t,v,h) in the equation (2) represents the pixel value in the second field.

In the equations (1) and (2), differences between the pixel values of a field and the pixel values of a corresponding field in the previous frame are calculated, and only when absolute values of the differences are larger than a threshold value T1, the absolute values of the differences are summed. The correlation values calculated by the equations (1) and (2) are the sums of the differences which are equal to the threshold value t1 or more which is selected to a higher level than a noise level. Therefore, influence by the noise existing uniformly in the telecine image signal is decreased. In FIG. 1, the correlation value cov1(t) of the first field is calculated by the correlation value calculation circuit 21, and the correlation value cov2(t) of the second field is calculated by the correlation value calculation circuit 22, and the calculation results are output.

In the comparison circuit 23, the correlation value cov1(t) of the first field is compared with a predetermined threshold value T2, and it is determined that the first field is a duplicated field, when a relation (3) is satisfied.

$$cov1(t) < T2 \qquad (3)$$

In the same way, in the comparison circuit 24, the correlation value cov2(t) of the second field is compared with the threshold value T2, and it is determined that the second field is a duplicated field, when a relation (4) is satisfied.

$$cov2(t) < T2 \qquad (4)$$

In the relation (4), if the correlation value cov1(t) is smaller than the threshold value T2, it is determined that the first field is the duplicated field. In a similar manner, if the correlation value cov2(t) is smaller than the threshold value T2, it is determined that the second field is the duplicated field.

Moreover, the correlation values cov1(t) and cov2(t) are inputted to the correlation value comparison circuits 25 and 26. When the comparison results represented by relations (5) and (6) are attained by multiplying a coefficient value T3, it is determined that a field is the duplicated field (steps S22, S23 in FIG. 19).

$$cov2(t) > cov1(t) \times T3 \qquad (5)$$

$$cov1(t) > cov2(t) \times T3 \qquad (6)$$

In the present embodiment, reason for comparing between two correlation values as shown by relations (5) and (6) is explained hereafter. FIG. 20 is a diagram of arrangement of fields of entire combinations in conversion by the 3:2 pulldown method. Rectangles represent fields, and a field placed rightward of an arrow is duplicated from a field placed leftward of the arrow. As shown in FIG. 20, in the case that a first field f1 in frames F1–F6 is the duplicated field, it is found that a second field f2 in the same frame is not the duplicated field. In a similar manner, in the case that a second field f2 in the frames F1–F6 is the duplicated field, it is found that the first field f1 of the same frame is not the duplicated field. Therefore, the correlation value of the duplicated field is very small in comparison with the correlation value of the other field of the same frame. Consequently, the duplicated field can be determined.

In the present embodiment, since comparison is carried out between the correlation values, the duplicated field can be reliably detected in comparison with the detection by one correlation value in the prior art. The threshold value T2 depends on the number of pixels, therefore, the threshold value T2 must be select to a value corresponding to an image size. However, a threshold value which does not depend on the image size can be set by normalizing the correlation value by the number of pixels. In the present embodiment, both the comparison between the correlation value and the threshold value by relations (3) and (4) and the comparison between the correlation values represented by relations (5) and (6) are carried out only comparison between the correlation values shown by relations (5) and (6) can be carried out.

In the comparison circuits 23 and 24 or the correlation value comparison circuits 25 and 26, when the duplicated field is detected, a logical "one" is output, and in other cases, a logical "zero" is output. It is determined whether the first field or the second field is the duplicated fields or not by these outputs, and a resultant output is output to the phase holding circuit 27 (step S24 in FIG. 19).

Figure 19:
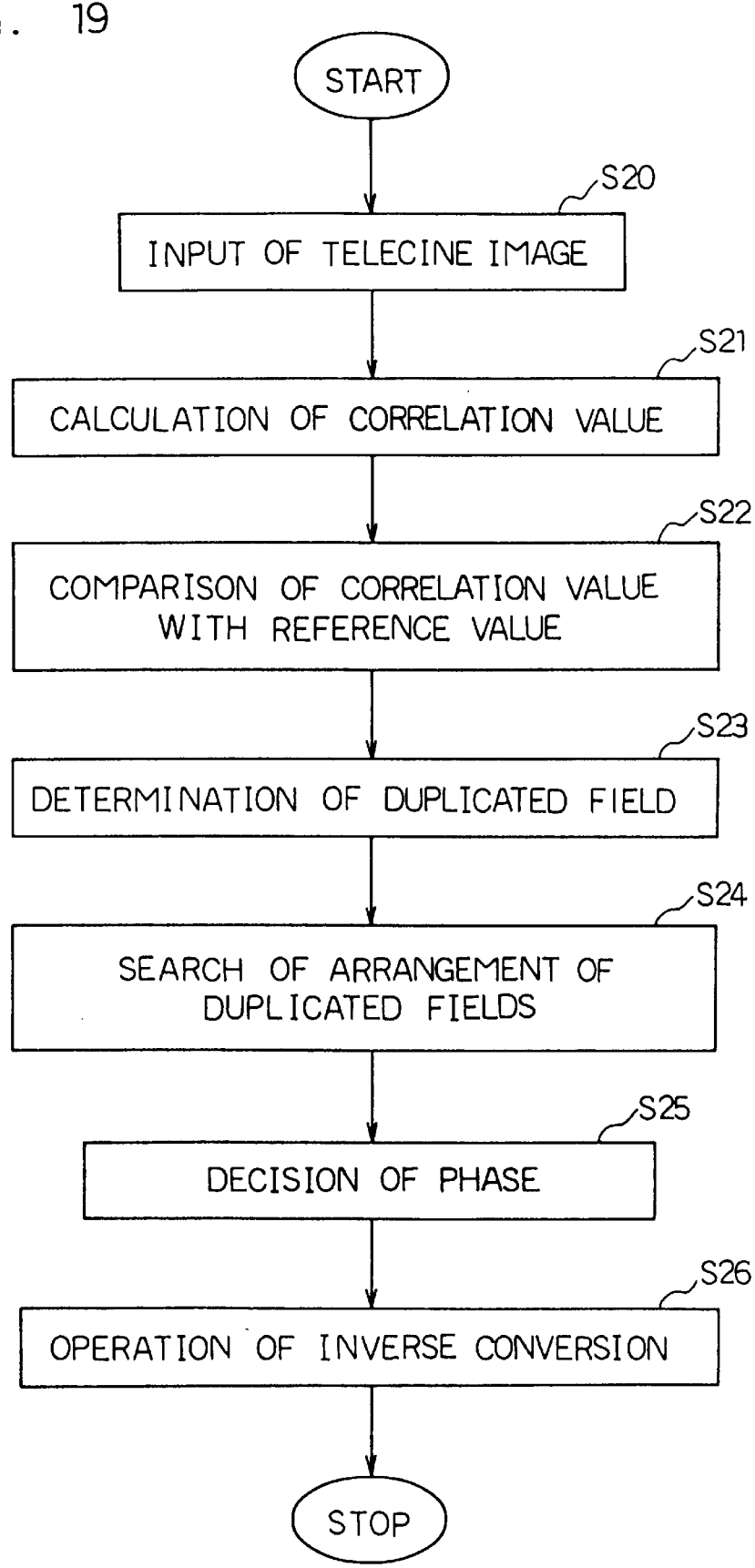
FIG. 19 is a flowchart of a telecine image conversion method in accordance with the present invention.

In the phase holding circuit 27, determination result of the duplicated field is held every frame, and a phase of fields of plural frames is detected (step S25 in FIG. 19). When it is determined that the first field of a frame at a time t is the duplicated field, determination result f1f(t) is represented by logical "one", and in other cases, the determination result f1f(t) is represented by logical "zero". In a similar manner, when it is determined that the second field is the duplicated field, determination result f2f(t) is represented by logical "one", and in other cases, determination result f2f(t) is represented by logical "zero". An "available phase pattern" for determination is detected by the determination results f1f(t) and f2f(t) of the duplicated fields, and phase information composed of the detected available phase patterns and the number of available phase patterns are derived.

A relation between the duplicated field and the phase pattern is described hereafter. Existent phase patterns in six frames F1–F6 converted by the 3:2 pulldown method are five kinds of phase pattern as shown in FIG. 20. The five kinds of phase patterns are represented by binary of five digits as shown in right column in FIG. 20, and indicated by ph[0], ph[1], ph[2], ph[3] and ph[4], respectively. The phase pattern by the conversion of the 3:2 pulldown method changes in the order of ph[0]→ph[1]→ph[2]→ph[3]→ph[4]→ph[0] every advance of one frame.

Table 1 is a table showing necessariness or unnecessariness of determination of the phase pattern in combination of a phase pattern and a time. In Table 1, in the phase patterns of the six frames F1–F6 of inputted successive images, the phase patterns ph[0]–ph[4] by the conversion of the 3:2 pulldown method are arranged in the left column. States of determination results f1f(t) and f2f(t) at times (t), (t+1), (t+2), (t+3) and (t+4) are arranged an upper row. Asterisk "*" represents combination of one of the phase patterns ph[0]–ph[4] and one of the times t–t+4 which is necessary no determination of phase pattern. Numeral "1" represents comparison result.

TABLE 1

|       | f1f(t) | f2f(t) | f1f(t + 1) | f2f(t + 1) | f1f(t + 2) | f2f(t + 2) | f1f(t + 3) | f2f(t + 3) | f1f(t + 4) | f2f(t + 4) |
|-------|--------|--------|------------|------------|------------|------------|------------|------------|------------|------------|
| ph[0] | *      | *      | 1          | *          | *          | *          | *          | 1          | *          | *          |
| ph[1] | *      | *      | *          | *          | 1          | *          | *          | *          | *          | 1          |
| ph[2] | *      | 1      | *          | *          | *          | *          | 1          | *          | *          | *          |
| ph[3] | *      | *      | *          | 1          | *          | *          | *          | *          | 1          | *          |
| ph[4] | 1      | *      | *          | *          | *          | 1          | *          | *          | *          | *          |

According to Table 1, the phase information of six frames of inputted successive images are represented by a logical sum fmph(t) of each phase pattern ph as shown in equation (7).

$$fmph(t) = f1f(t + 1) \cdot f2f(t + 3) \cdot ph[[0] + \quad (7)$$
$$f1f(t + 2) \cdot f2f(t + 4) \cdot ph[1] + f1f(t + 3) \cdot f2f(t) \cdot ph[2] +$$
$$f1f(t + 4) \cdot f2f(t + 1) \cdot ph[3] + f1f(t) \cdot f2f(t + 2) \cdot ph[4]$$

Referring to equation (7), though multiplication of the determination results f1f(t), f2f(t) and one of the phase patterns ph[0]–ph[4] are carried out, as shown in equation (8), the number $N_{ph}$ of available phase patterns can be derived by calculating a sum of products of only the determination results f1f(t) and f2f(t).

$$(t) = f1f(t + 1) \cdot f2f(t + 3) + f1f(t + 2) \cdot f2f(t + 4) + \quad (8)$$
$$f1f(t + 3) \cdot f2f(t) + f1f(t + 4) \cdot f2f(t + 1) + f1f(t) \cdot f2f(t + 2)$$

In the phase synchronization circuit 3, the phase of phase patterns in successive images having the period of conversion by the 3:2 pulldown method is detected from the successive telecine image, and phase synchronization is carried out. Operation of the phase synchronization circuit 3 is described with reference to FIG. 8. First, at step S0, data of the phase and the number $N_{ph}$ of available phase patterns is inputted from the phase holding circuit 27. At step S1, it is determined whether the phase pattern of the conversion of the 3:2 pulldown method is detected or not in the phase patterns of the inputted image. The detection is determined by the number $N_{ph}$ of the available phase patterns inputted from the phase holding circuit 27 at step S0. The case of zero of the number $N_{ph}$ of available phase patterns represents that the inputted successive images are not converted by the 3:2 pulldown method, and therefore operation is completed by irregularity of phase at step S6. In the case that the number $N_{ph}$ of available phase patterns is not zero, at step S2, it is determined whether the phase patterns is decided or not. In the case that the number $N_{ph}$ of available phase patterns is one, the phase information of the output of the phase holding circuit 27 coincides with one of phase patterns ph[0], ph[1], ph[2], ph[3] and ph[4]. Therefore, the phase is decided at step S7 and operation is completed. In the case that the number $N_{ph}$ of available phase patterns is two, it is considered that the inputted successive images are a still image or not converted by the ordinary 3:2 pulldown method. In the above-mentioned case, it is determined whether the phase pattern is regular or not at step S4, and it is determined whether the phase is decided or not. A decision method of the phase in the case of two or more of the number $N_{ph}$ of available phase patterns is described hereafter.

In the successive images converted by the 3:2 pulldown method, if the phase pattern at the time (t) is found, the phase patterns of the successive images at the time (t–1) and (t+1) are found. For example, if a phase pattern at the time (t) is the phase pattern ph[2], a phase pattern at the time (t+1) is the phase pattern ph[3], and a phase pattern at the time (t–1) is the phase pattern ph[1].

Therefore, even in the case that the input phase pattern fmph(t) at the time (t) is not decided, if the phase pattern at the time (t–1) or the time (t+1) is decided, the phase pattern at the time (t) can be decided by the above-mentioned phase patterns.

Therefore, in the case that the number Nph of available phase patterns is two or more, namely, when plural phase patterns coincide with the available phase patterns, and several phase patterns become available phase patterns, first, a phase pattern at the time t in the conversion of 3:2 pulldown method is obtained from the previous phase pattern by one frame period by the phase information renewal circuit 302 in the phase synchronization circuit 3.

It is searched whether the phase pattern at the time t in the conversion of the 3:2 pulldown method exists or not in plural available phase patterns represented by phase information obtained by the phase holding circuit 27.

This is determined by searching whether a logical product of the phase information of the output of the phase holding circuit 27 and the output of the phase information renewal circuit 302 coincides with the output of the phase information renewal circuit 302 or not.

In the case that the phase pattern converted by the 3:2 pulldown method at the time t exists in the plural available patterns, it is considered that the image stored in the field memory 1 is converted by the 3:2 pulldown method, and the phase of the phase pattern is decided.

On the contrary, in the case that the phase pattern converted by the 3:2 pulldown method at the time t does not exist in the plural available patterns, the phase of the phase pattern can not be decided.

In the case that the image is converted by a method different from the 3:2 pulldown method in a part of successive images of which the number $N_{ph}$ of phase patterns is two or more and the phase can not be decided, the part takes a phase pattern which is different from a phase pattern predicted by the previous phase pattern or the following phase pattern, because the periods of the phase patterns are different from each other.

Such phase pattern is an irregular phase pattern, and it is considered that the part is converted by the method which is not the 3:2 pulldown method. The irregular phase pattern can be easily detected by a logical product of the logical value of the phase fmph(t) and the logical value of the phase predicted by the previous phase pattern and the following phase pattern. Consequently, when the phase of the phase pattern is decided by the phase synchronization circuit 3, one of binary members of five digits [00001], [00010], [00100], [01000], [10000] representing the phase pattern is output, and when the phase can not be decided, a binary number of five digits [00000] is output (step S26 in FIG. 19).

In the control unit 4, inverse conversion of the phase patterns as shown in FIG. 20 is carried out by controlling output of the images. However, when the inverse conversion is started or the phase is irregular, the images are continuously output, because the phase for applying the inverse conversion can not be determined. Operation of the control unit 4 is described hereafter. An input field image is represented by F(2s+f). Letter "s" represents a time of an input field image, and "2s" is an integer representing the time of the frame image comprising two fields. Data "f" represents whether the inputted field image is the first field or the second field, and the logical "zero" of "f" (f=0) represents the first field and the logical "one" thereof represents the second field. For convenience of description, the field images F(2s+f−5), F(2s+f−4), F(2s+f−3), F(2s+f−2) and F(2s+f−1) are stored in the field memories 101, 102, 103, 104 and 105, respectively. Numerals 5, 4, 3, 2 and 1 represent an input order of the field images. When a field image F(2s+f) is inputted, the control unit controls the switch 106 to select the field memory 101 storing the field image F(2s+f−5). Consequently, the oldest field image F(2s+f−5) in time sequence of the field images stored in the field memory 101 is replaced with the inputted field image F(2s+f).

Subsequently, a previous field image F(2s+f−2) by one frame period with respect to the input field image F(2s+f) is output. For this operation, control unit 4 controls the switch 107 so as to select the field memory 104 storing the field image F(2s+f−2). In order to calculate the correlation value every field, the field image F(2s+f) and the field image F(2s+f−2) are applied to the correlation value calculation circuit 21 or the correlation value calculation circuit 22. The control unit 4 controls the switch 109 and the switch 110 in compliance with the data f for representing whether the input field image F(2s+f) is the first field or the second field. When the data f is logical "zero", the correlation value calculation circuit 21 is selected, and when the data f is logical "one", the correlation value calculation circuit 22 is selected. Subsequently, a sequence of inversely converted images is output by interrupting output of the duplicated field images in the successive telecine images. The field image which is output is the oldest field image in the field images stored in the field memory 1, and is the field image F(2s+f−4) in the above-mentioned operation. It is determined by a phase pattern inputted to the control unit 4 whether the field image F(2s+f−4) is the duplicated field or not. In the case that a phase pattern is decided and is the phase pattern ph[2], the switch 108 is opened by control of the control unit 4, and furthermore, logical "zero" is output to a picture enable signal output terminal 4A. The picture enable signal indicates that an image is output or not to a film image signal output terminal 1A. When the film image signal is output, logical "one" is output, and when it is not output, logical "zero" is output. In the case that the phase pattern is decided and is not the phase pattern ph[2], the control unit 4 controls the switch 108 so as to select the field memory 102 storing the field image F(2s+f−4), and outputs logical "one" to the picture enable signal output terminal 4A. In the case that the phase pattern is not decided, the control unit 4 controls the switch 108 so as to select the field memory 102 storing the field image F(2s+f−4), and logical "one" is output to the picture enable signal output terminal 4A.

According to the first embodiment, erroneous conversion due to noise in the image signal is reduced, and the successive telecine images converted by the 3:2 pulldown method can be inversely converted automatically.

Figure 9:
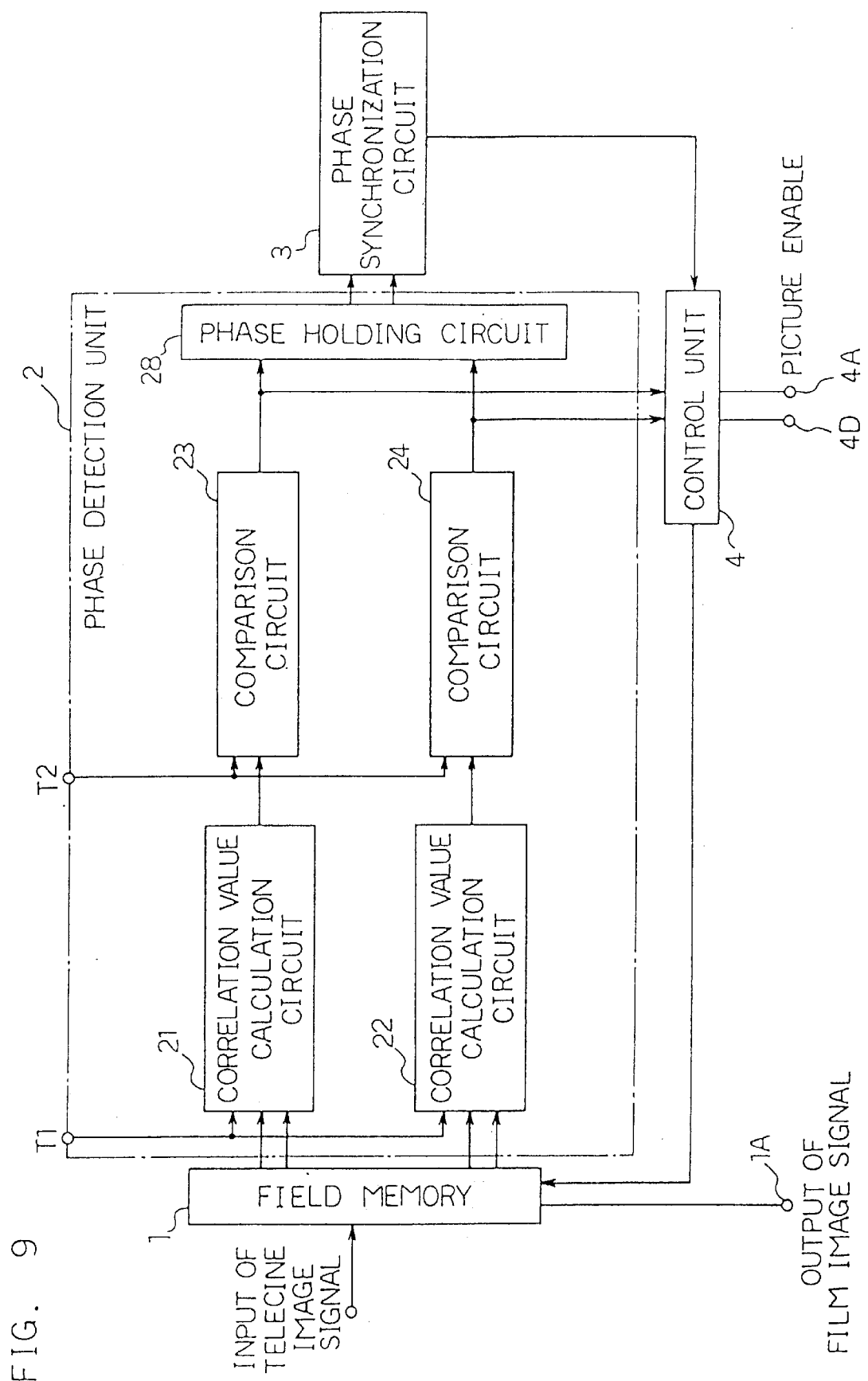
FIG. 9 is a block diagram of an embodiment that the correlation value comparison circuits are removed from the circuit diagram of FIG. 1 of the first embodiment.
Figure 10:
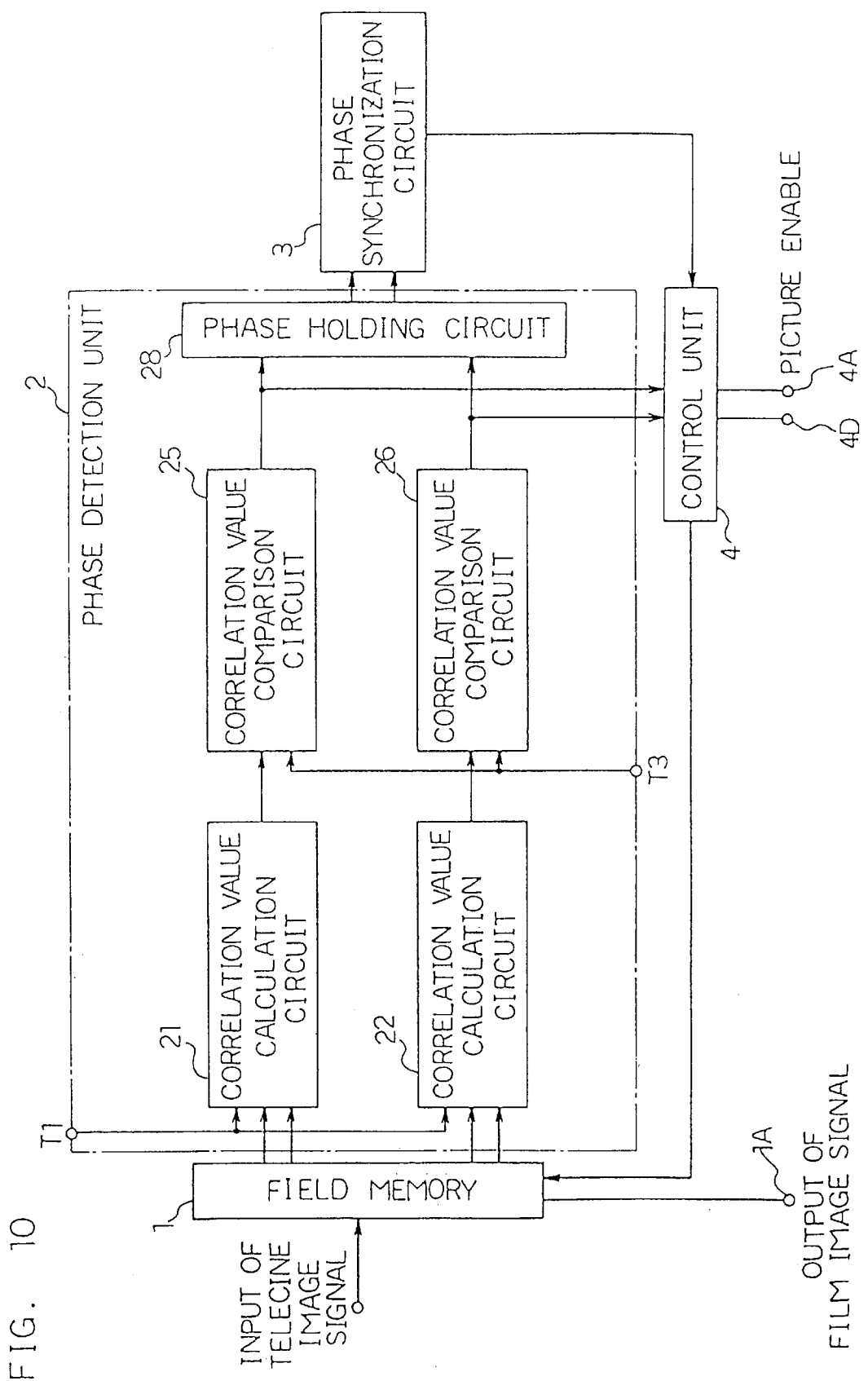
FIG. 10 is a block diagram of an embodiment that the comparison circuits are removed from the circuit diagram of FIG. 1 of the first embodiment.
Figure 11:
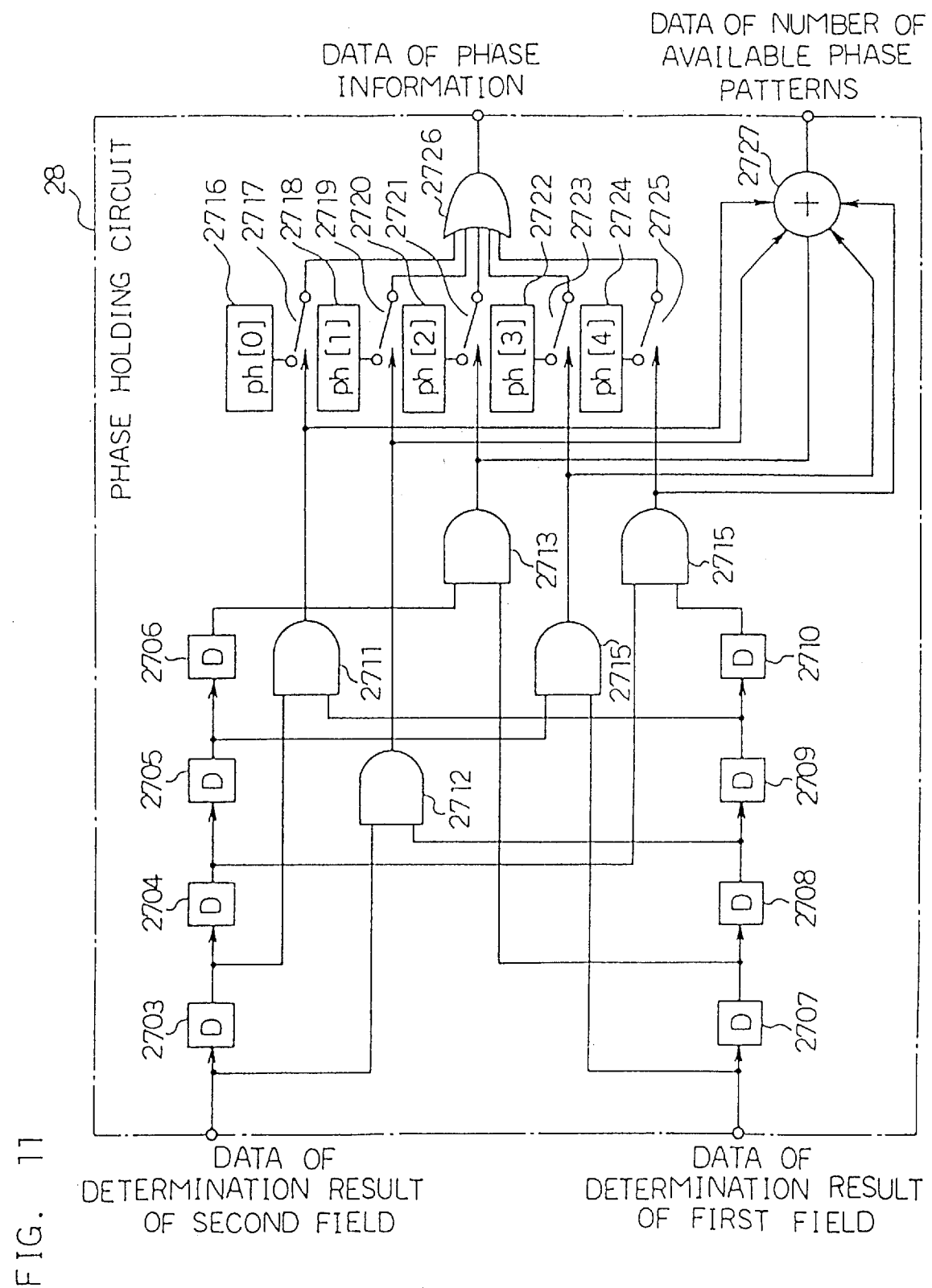
FIG. 11 is a detailed block diagram of the phase holding circuit in the case that the comparison circuits or the correlation comparison circuits are removed from the block diagram of FIG. 1 of the first embodiment.

The telecine image conversion apparatus in the first embodiment employs a configuration which is resistant against the influence of noise. In the case that the influence of noise is small, one kind of the comparison circuits 23, 24 and the correlation value comparison circuits 25, 26 which are used for determination of duplicated field can be omitted. In a similar manner, the limiters 213 for processing the threshold values in the correlation value calculation circuits 21 and 22 can be omitted. A block diagram of a circuit of which the correlation value comparison circuits 25 and 26 are omitted is shown in FIG. 9. In a similar manner, a block diagram of a circuit of which the comparison circuits 23 and 24 are omitted as shown in FIG. 10. In the case of the omission of the comparison circuits 23, 24 or the correlation value comparison circuits 25, 26, the phase holding circuit 27 is replaced with a phase holding circuit 28 which is changed in circuit configuration because the number of input lines are reduced. A detailed configuration of the phase holding circuit 28 is shown in FIG. 11. Main difference of the phase holding circuit 28 in FIG. 11 from the phase holding circuit 27 in FIG. 6 is omissions of OR circuits 2701 and 2702 of respective input stages.

Figure 12:
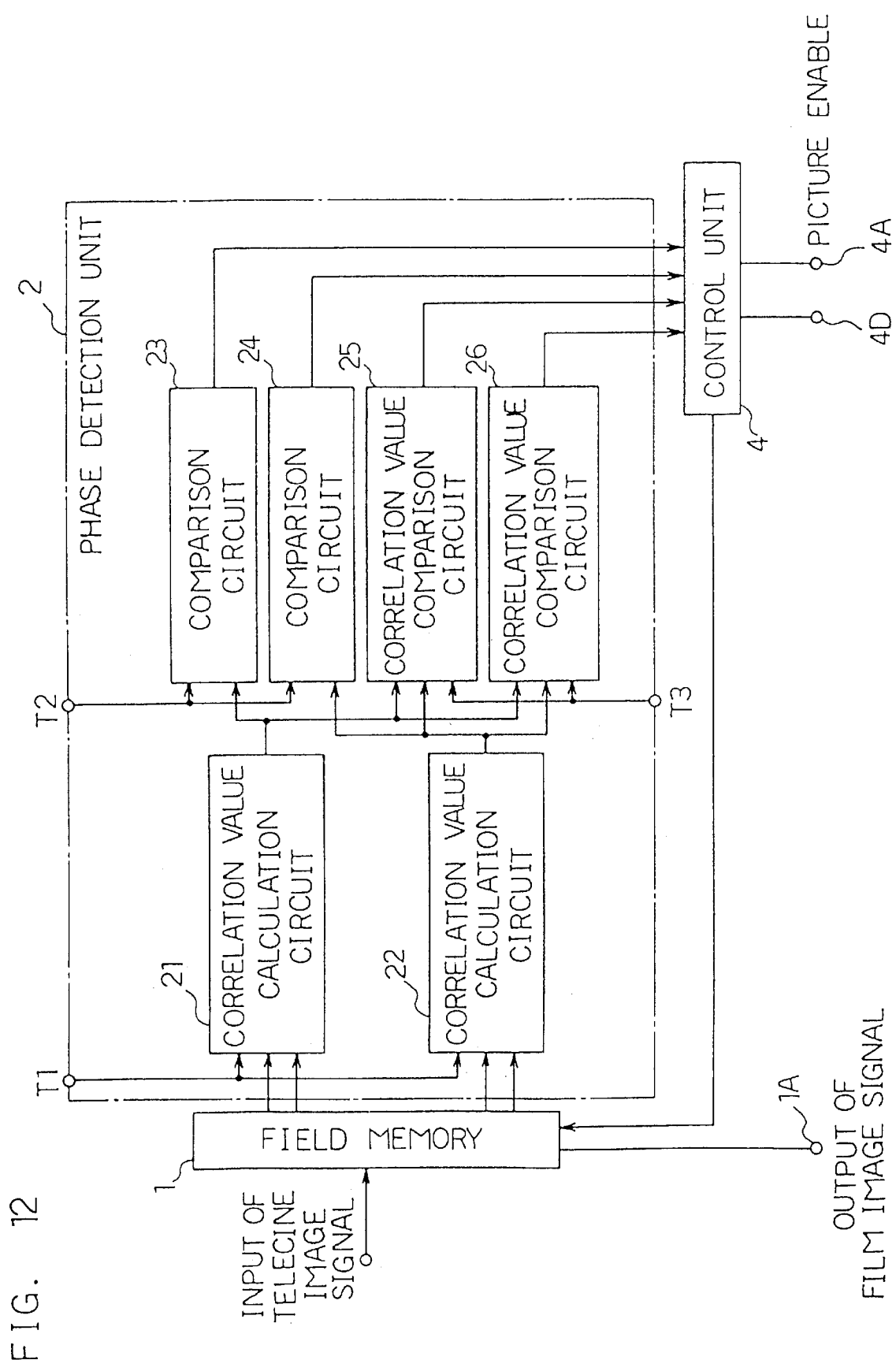
FIG. 12 is a block diagram of an embodiment that the phase holding circuits and the phase synchronization circuits are removed from the block diagram of FIG. 1 of the first embodiment.

In the case that the influence of noise is further small, an accuracy of determination of the duplicated field is improved. Therefore, phase determination operation utilizing the phase patterns can be omitted. In the case of omission of the phase determination operation, in a block diagram as shown in FIG. 12, the control unit 4 directly controls input and output of the field memory 1 on the basis of the determination result of the duplicated field obtained by the comparison circuits 23, 24 or the correlation value comparison circuits 25, 26.

Figure 13:
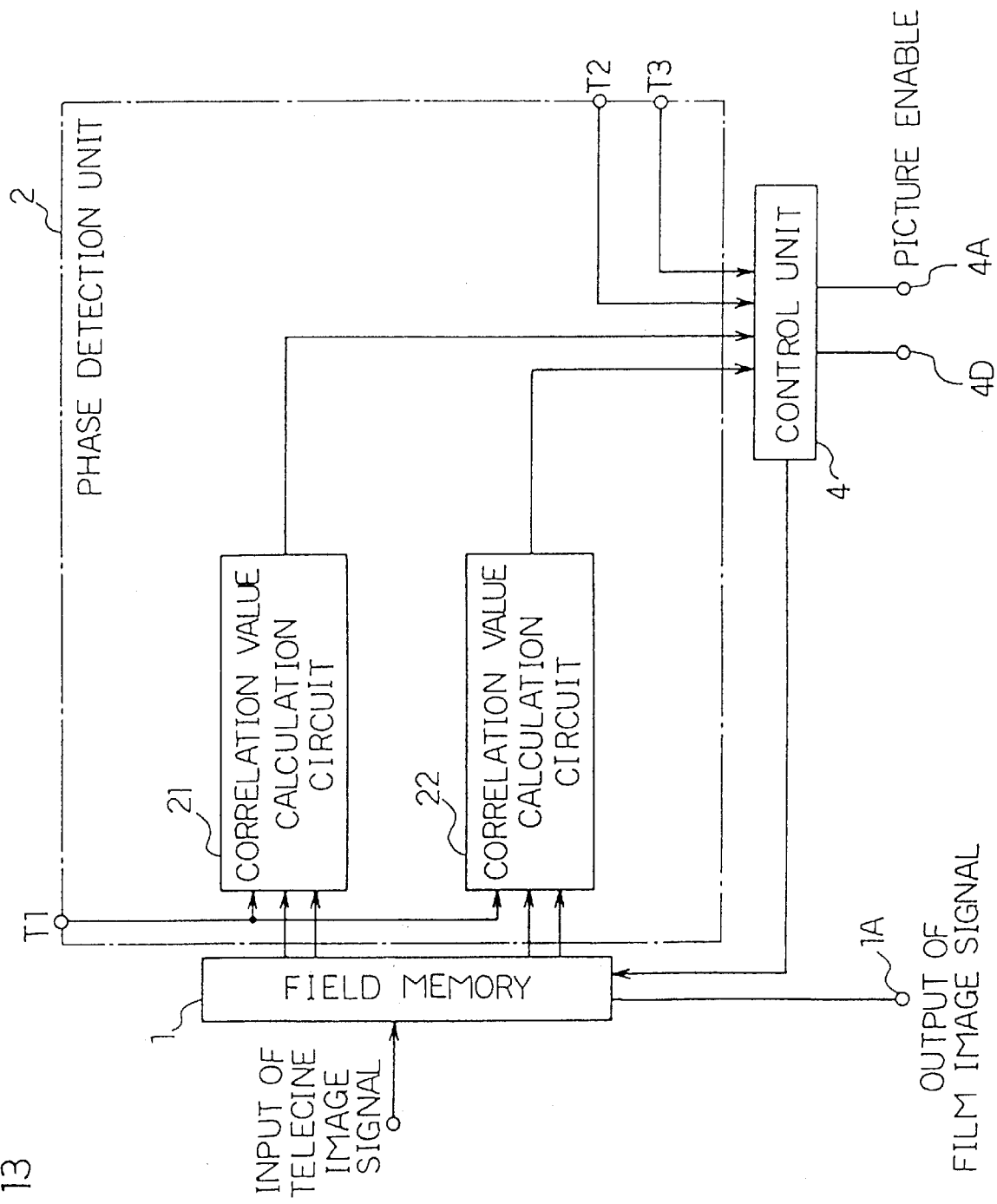
FIG. 13 is a block diagram of an embodiment in the case that operations after the output of the correlation value calculation circuit in the block diagram of FIG. 12 is carried out by a CPU of a control unit.

In the first embodiment as shown in FIG. 1, a high speed processing is required in the correlation value calculation circuits 21 and 22, because the calculation is carried out every pixel. On the other hand, in the processings after the operation by the correlation value calculation circuits 21 and 22, the amount of processing decreases, because operation is carried out every field or frame. Therefore, as shown in FIG. 13, the telecine image conversion apparatus is simplified by processing the outputs of the correlation value calculation circuits 21 and 22 by the control unit 4.

In the first embodiment, the control unit 4 continuously outputs the images in the case that the phase is not decided. The output of image signal can be controlled on the basis of the determination of duplicated field even in the case that the phase is not yet decided. In this case, the output of the images is controlled on the basis of a condition that one field image in three successive field images is decimated or no field image is decimated.

Figure 14:
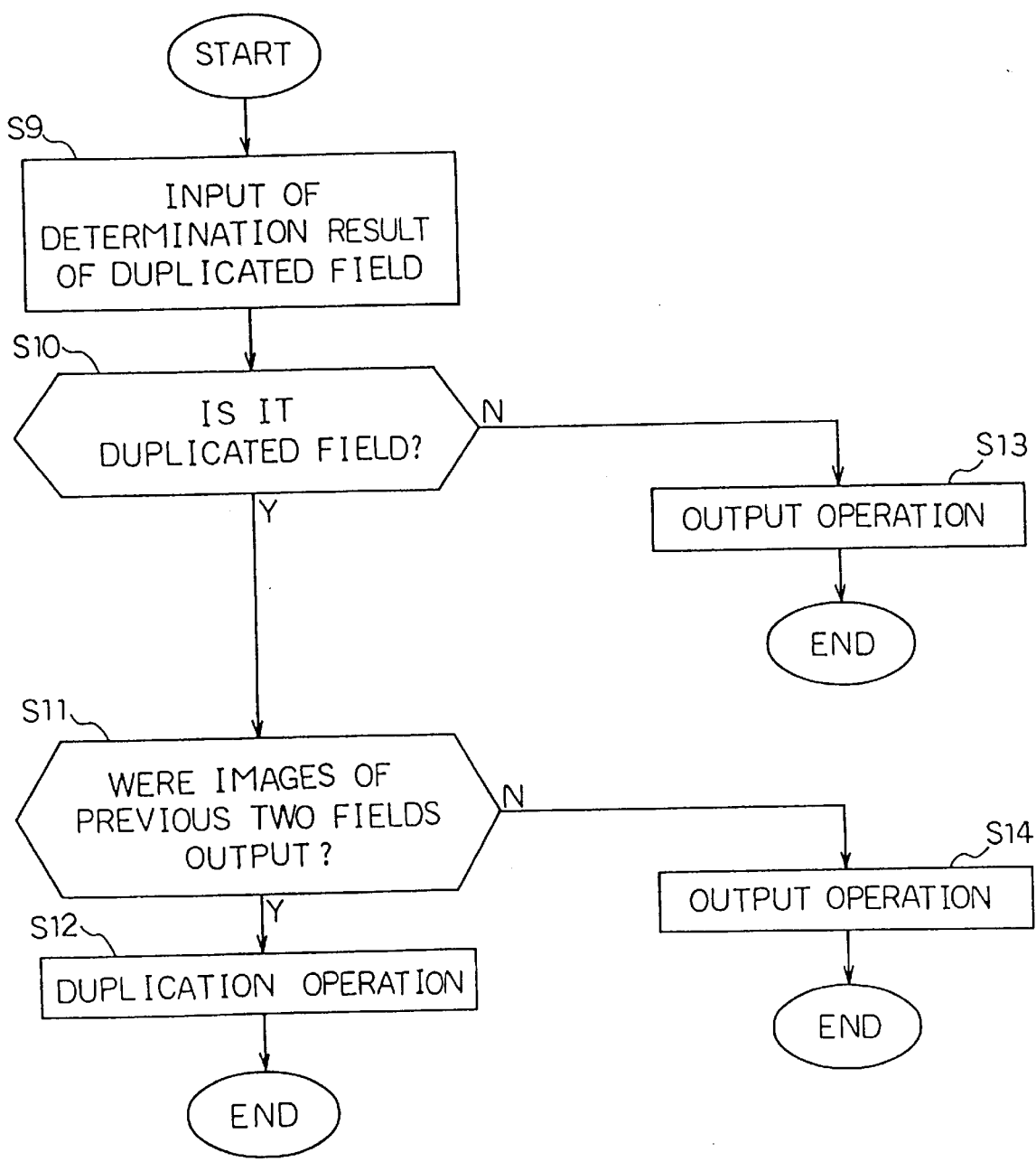
FIG. 14 is a flowchart of an algorithm for controlling output by a determination result of a duplicated field.
Figure 15:
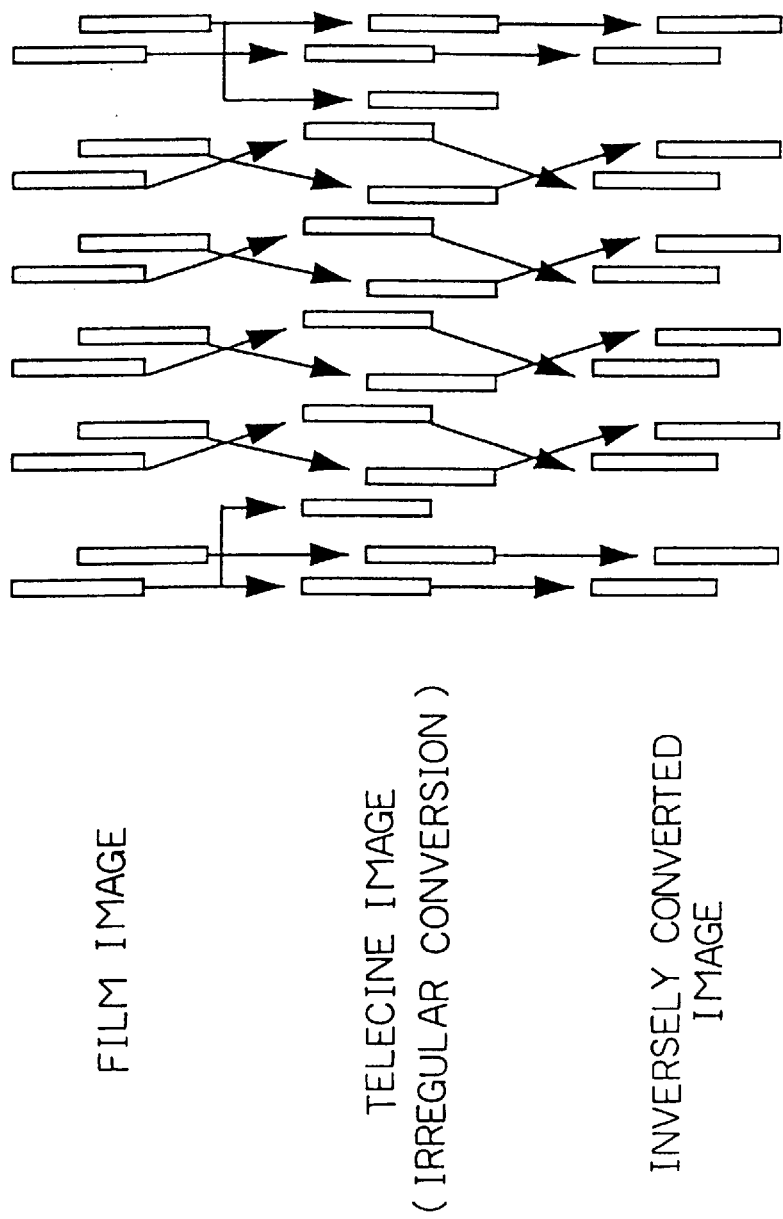
FIG. 15 is an illustration of an inverse conversion method of a telecine image converted by irregular conversion.

Processing operation of the control unit 4 is shown by a flowchart in FIG. 14. At step S9, determination result of the duplicated field is inputted. At step S10, processing is carried out on the basis of determination result of the duplicated field inputted at step S9. When it is determined that a field is not the duplicated field, a field image is output at step S13 and logical "one" is output to the picture enable signal output terminal 4A. When it is determined that the field is the duplicated field, then it is determined whether two previous field images are output or not at step S11. When one of two previous field images is not output because it is the duplicated field, the field image is output at step S14, and logical "one" is output to the picture enable signal output terminal 4A. When the two previous field images are output, the field image is not output by the decimation operation at step S12 and logical "zero" is output to the picture enable signal output terminal 4A. By the above-mentioned processing, the inverse conversion can be carried out in the case that the phase is not decided.

In other processing, the inverse conversion is carried out by controlling output of fields predetermined from appearance patterns of the duplicated fields in the case that the phase is not yet decided. This method is particularly effective in the case that irregular conversion is carried out by a predetermined pattern. An example of the irregular conversion and its inverse conversion is shown in FIG. 14.

[Second Embodiment]

Figure 16:
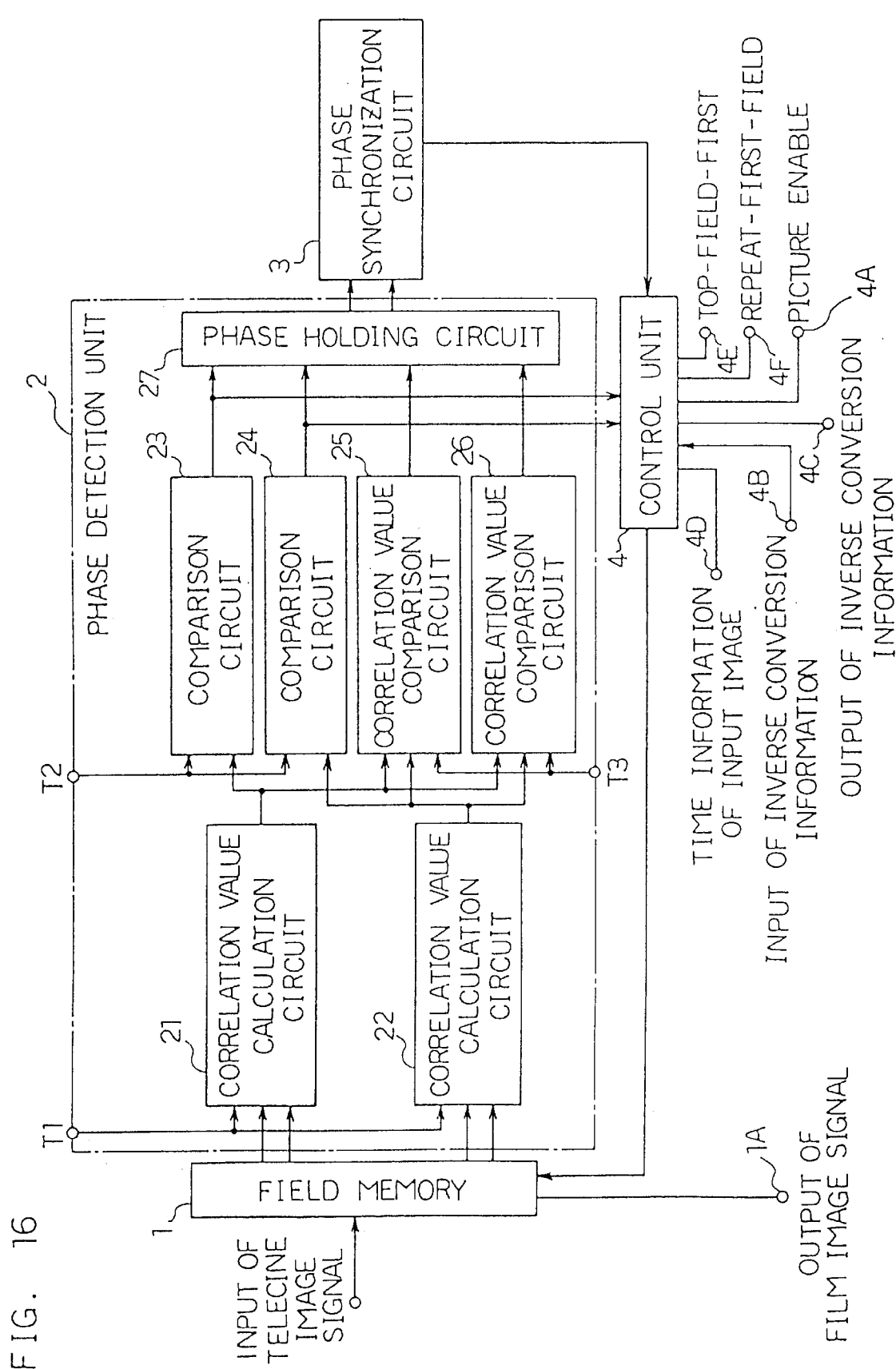
FIG. 16 is a block diagram of a second embodiment of the present invention.

A second embodiment of the telecine image conversion apparatus of the present invention is described with reference to FIG. 16. FIG. 16 is a block diagram of the telecine image conversion apparatus in the second embodiment, and elements similar to the elements of FIG. 1 are identified by like reference numerals. The telecine image conversion apparatus comprises the field memory 1, phase detection unit 2, phase synchronization circuit 3 and control unit 4 in a manner similar to FIG. 1. Referring to FIG. 16, the control unit 4 is provided with a signal line terminal 4B for inputting inverse conversion information representing a field to be duplicated or not, and a signal line terminals 4C for outputting time information of an input image. Reason for provision of the signal line terminals 4B and 4C is explained hereafter. In the inverse conversion of the telecine image for reducing the amount of data in coding operation of an image, a decoded image decoded by a later decoding operation must be returned to the original telecine image. Therefore, information of a decimated field image must be coded with the field image in the coding operation of the image so that the field image decimated in the inverse conversion of the telecine image can be reproduced in the decoding operation. For example, in the case that the telecine image is converted by only the 3:2 pulldown method, if an initial synchronization is attained, conversion or inverse conversion of the telecine image can be independently carried out of coding operation, because the conversion is carried out by one method. However, in the case that the telecine image is converted by the 3:2 pulldown method and a conversion method different from the 3:2 pulldown method, it must be recognized which field is decimated in the inverse conversion operation, or which field must be duplicated by a telecine conversion unit 56 in FIG. 18 at which timing. If information of the timing is not coded, synchronization of an image with audio sound can not be secured. Detailed description of the synchronization of the image with the audio sound is omitted.

Another reason for provision of the signal line terminals 4B and 4C is explained hereafter.

In a general method of improvement of image quality of the coded image, there is an image coding method that operations of plural times are applied to the same successive images and coding operation is carried out on the basis of the information prepared by the operations in advance. In this image coding method, the successive images to be coded are required to be the same. When noise mixes in the input signal of the successive images, reproducibility of the input signal is lost. Lach of the reproducibility of the input signal does not affect the case that the telecine image is not inversely converted. However, in the case that the telecine image is inversely converted and coded due to the noise in the inputted telecine image, reproducibility of the successive images after inverse conversion is not secured. The lack of the reproducibility largely affects the information used for the coding operation. Therefore, in order to secure the reproducibility of the successive images after inverse conversion, the same conversion must be carried out on basis of the result of the inverse conversion carried out in advance.

By the above-mentioned reason, operation of the control unit 4 in the second embodiment is carried out as described hereafter. In the case that information for inverse conversion does not exist in advance, the same operation as that of the first embodiment is carried out, and furthermore, operation which will be described below is added. For coding of an inversely converted image and for inverse conversion after the first inverse conversion, the control unit 4 outputs time information of a field image for carrying out output control to a terminal 4D. A picture enable information indicating whether the field image is output or not is output to a terminal 4A. A top-field-first information representing which of the first field and the second field leads the other in time sequence in output of the field image for configuration of a frame image is output to a terminal 4E. A repeat-first-field information representing whether a field image after one frame period of an output field image is output or not as a duplicated field of the output field image is output to a terminal 4F. In the case that the information of inverse conversion such as an inverse conversion after the first inverse conversion exists in advance, the information of the inverse conversion is inputted to the control unit 4, and input and output of the field memory 1 is controlled on the basis of the information of inverse conversion.

As mentioned above, according to the second embodiment, the same effect as that of the first embodiment is attained, and the telecine image conversion apparatus is further suitable for the coding of the image.

[Third Embodiment]

Figure 17:
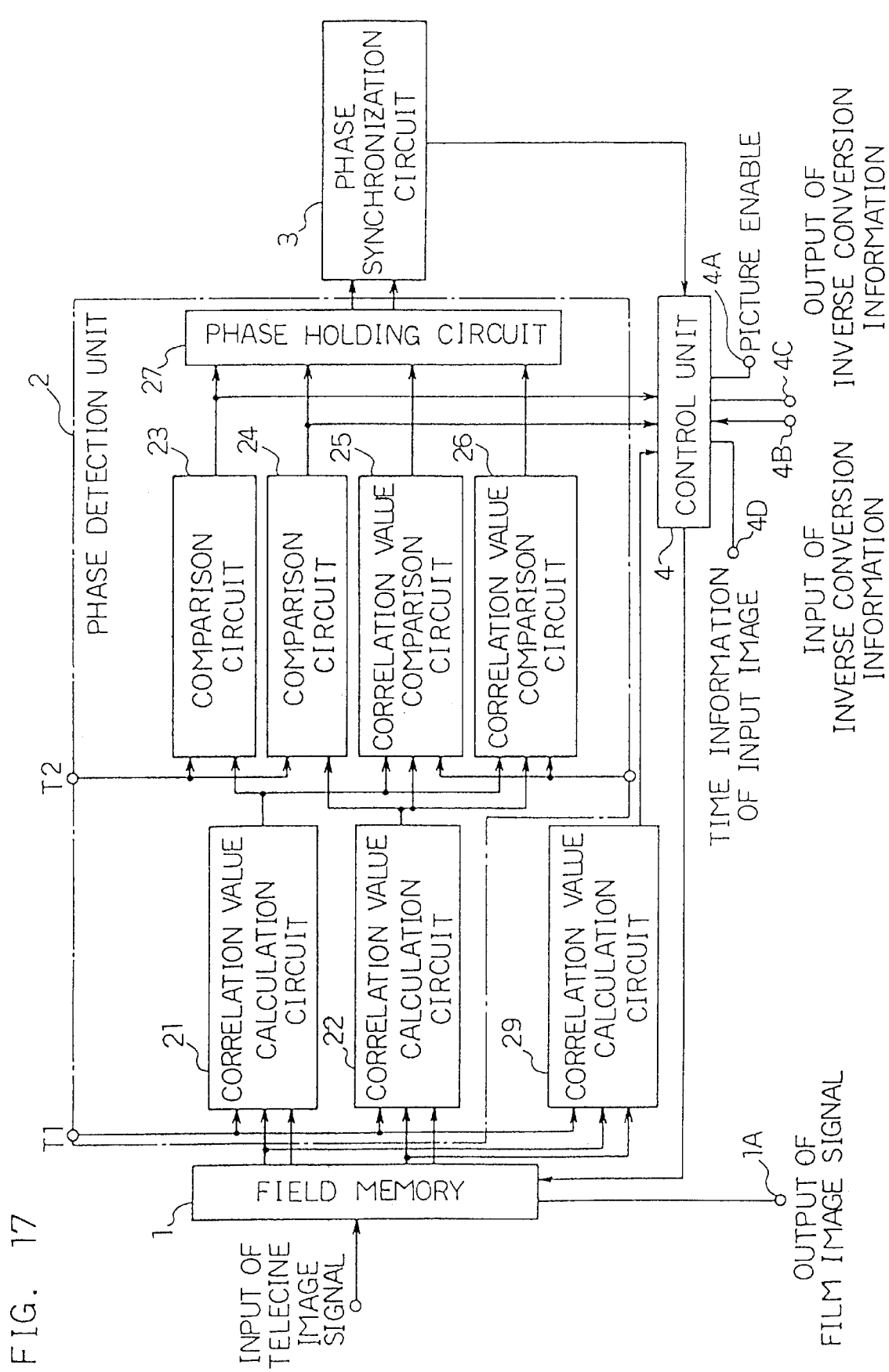
FIG. 17 is a block diagram of a third embodiment of the present invention.

A third embodiment of the telecine image conversion apparatus of the present invention is described with reference to FIG. 17. FIG. 17 is a block diagram of the telecine image conversion apparatus in the third embodiment, and elements similar to the elements in FIG. 16 of the second embodiment are identified by like numerals. In FIG. 17, provision of the field memory 1, phase detection unit 2, phase synchronization circuit 3 and control unit 4 is similar to that of FIG. 1. Difference of the configuration of FIG. 17 from that in FIG. 1 is that the former has a correlation value calculation circuit 29 and inputs the output of the correlation value calculation circuit 29 to the control unit 4.

Reason for such provision of the correlation value calculation circuit 29 is described hereafter. The telecine image converted by the 3:2 pulldown method becomes a progressive image that one image is formed by a frame image in the successive images after inverse conversion. Therefore, efficiency in coding operation can be improved by applying coding operation specialized for the progressive image. However, in the case that irregular conversion was applied to the film image or the telecine image was edited, it is not secured that the successive images after inverse conversion are the progressive images. In the worst case, there is the possibility that the scene in the image of the first field is different from the scene in the image of the second field. The coding of the successive images as the progressive image is not only redundant, but also deteriorates an image quality of a coded image.

By the above-mentioned reason, a correlation value between an image and a previous image by one field period is calculated, and a correlation value between the image of the first field and the image of the second field of a frame image in the successive images after conversion is output as information for coding an image. Consequently, a difference of the operation in the third embodiment from the operation in the second embodiment is that the third embodiment calculates a correlation value between a field image inputted to the field memory 1 and the previous field image of one field period by the correlation value calculation circuit 29, and that output of the correlation value calculation circuit 29 is inputted to the control unit 4. Furthermore, a difference in the operation is to output the output of the correlation value calculation circuit 29 in a manner similar to information of other coding operation in the case that the information for inverse conversion does not exist in the control unit 4 in advance. According to the above-mentioned configuration, an output image after conversion is further adequate to coding of the image, and more information which is used for improvement of the image quality in coding operation can be output.

Incidentally, the inverse conversion method and apparatus of the telecine image in the present invention are very effective to reduction of information in coding of the image. Furthermore, reduction of the information is realizable by applying a prefilter commonly known as one of general methods for reducing information in coding of an image to the image after inverse conversion of the telecine image. However, because the reduction of the information by the prefilter has been induced by limiting band widths in time and space of an image, application of the inverse conversion to the telecine image filtered by the prefilter causes erroneous conversion. For this reason, it is important that the prefilter must be applied to the image after inverse conversion of the telecine image.

Figure 18:
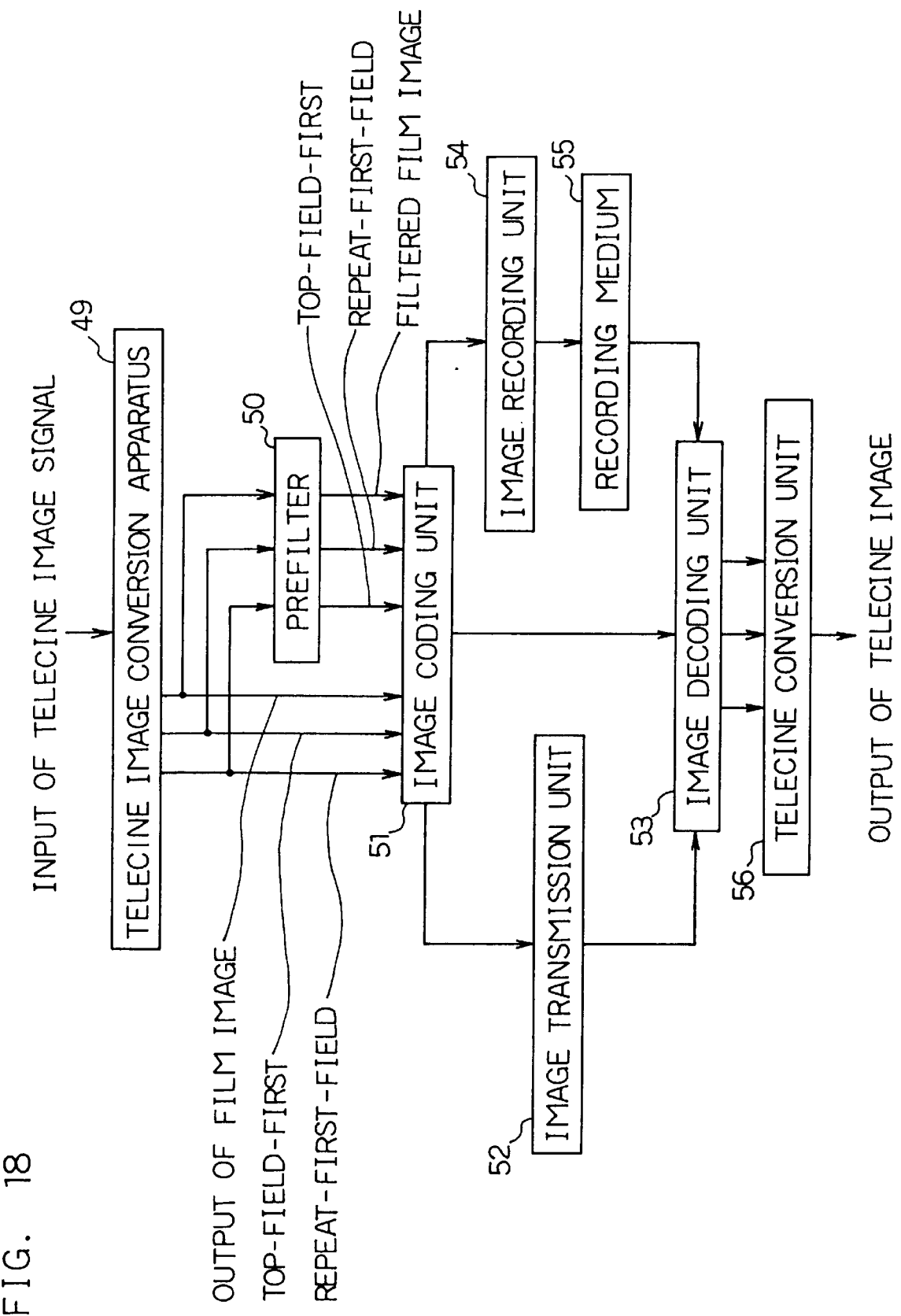
FIG. 18 is a block diagram of an apparatus for coding and decoding the image inversely converted by the telecine conversion apparatus of the present invention.

FIG. 18 is a block diagram of an apparatus for coding and decoding the inversely converted image of the telecine image conversion apparatus of the present invention. Referring to FIG. 18, the film image signal, top-field-first information and repeat-first-field information output from the telecine image conversion apparatus 49 are applied to an image coding unit 51 and a prefilter 50. The film image coded by the image coding unit 51 is transmitted to an image decoding unit 53 through an image transmission units 52, and decoded thereby. On the other hand, the film image coded by the image coding unit 51 can be recorded on a recording medium 55 by an image recording unit 54. The film image decoded by the image decoding unit 53 is applied to a telecine conversion unit 56, and thereby, a telecine image is reproduced.

Although the present invention has been described in terms of the presently preferred embodiments, it is to be understood that such disclosure is not to be interpreted as limiting. Various alternations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A telecine image conversion method for inversely converting a telecine image to a film image comprising the steps of:

inputting a telecine image signal being successive in time series, calculating the absolute value of a difference between a pixel value represented by a luminance of a pixel in a field and a pixel value in the previous field by one frame period with respect to a first field and a second field in said telecine image signal, and calculating a correlation value of said first field and a correlation value of said second field in said telecine image by summing the respective absolute values, determining the image of said first field as an image of a duplicated field in the case that said correlation value of said first field is smaller than a predetermined reference value, and determining the image of said second field as an image of a duplicated field in the case that said correlation value of said second field in smaller than said predetermined reference value.

2. A telecine image conversion method for inversely converting a telecine image to a film image comprising the steps of:

inputting a telecine image signal being successive in time series, calculating the absolute value of a difference between a pixel value represented by a luminance of a pixel in a field and a pixel value of the previous field by one frame period with respect to a first field and a second field in said telecine image signal, and calculating a correlation value of said first field and a correlation value of said second field of said telecine video signal by summing the respective absolute values, determining the image of said first field as an image of a duplicated field in the case that a relative value of the correlation value of said second field with respect to the correlation value of said first field of the same frame exceeds a predetermined reference value, and determining the image of said second field as an image of a duplicated field in the case that a relative value of the correlation value of said first field with respect to the correlation value of said second field of the same frame exceeds said reference value.

3. A telecine image conversion method for inversely converting a telecine image to a film image comprising the steps of:

inputting a telecine image signal being successive in time series, calculating the absolute value of a difference between a pixel value represented by a luminance of a pixel in a field and a pixel value in the previous field by one frame period with respect to a first field and a second field in said telecine image signal, and calculating a correlation value of said first field and a correlation value of said second field in said telecine image by summing the respective absolute values, determining the image of said first field as an image of a duplicated field in the case that said correlation value of said first field is smaller than a predetermined reference value, determining the image of said second field as an image of a duplicated field in the case that said correlation value of said second field in smaller than said predetermined reference value, searching arrangement of said duplicated fields in time series with respect to said inputted telecine image signal, selecting a specific combination as a decided phase from combinations of arrangements of entire duplicated fields attained by conversion by a 3:2 pulldown method of telecine conversion methods, and starting inverse conversion of said inputted telecine image by synchronizing with said decided phase.

4. A telecine image conversion method for inversely converting a telecine image to a film image comprising the steps of:

inputting a telecine image signal being successive in time series, calculating the absolute value of a difference between a pixel value represented by a luminance of a pixel in a field and a pixel value of the previous field by one frame period with respect to a first field and a second field in said telecine image signal, and calculating a correlation value of said first field and a correlation value of said second field of said telecine video signal by summing the respective absolute values, determining the image of said first field as an image of a duplicated field in the case that a relative value of the correlation value of said second field with respect to the correlation value of said first field of the same frame exceeds a predetermined reference value, determining the image of said second field as an image of a duplicated field in the case that a relative value of the correlation value of said first field with respect to the correlation value of said second field of the same frame exceeds said reference value, searching arrangement of said duplicated fields in time series with respect to said inputted telecine image signal, selecting a specific combination as an decided phase from combinations of arrangements of entire duplicated fields attained by conversion by a 3:2 pulldown method of telecine conversion methods, and starting inverse conversion of said inputted telecine image by synchronizing with said decided phase.

5. A telecine image conversion method in accordance with claim 3 further comprising the steps of:

detecting successive images converted by a conversion method different from said 3:2 pulldown method in the successive images of said telecine image, and synchronizing again with said decided phase in conversion by said 3:2 pulldown method after output of said detected successive images without conversion.

6. A telecine image conversion method in accordance with claim 4 further comprising the steps of:

detecting successive images converted by a conversion method different from said 3:2 pulldown method in the successive images of said telecine image, and synchronizing again with said initial phase in conversion by said 3:2 pulldown method after output of said detected successive images without conversion.

7. A telecine image conversion method in accordance with claim 3 further comprising the steps of:

detecting successive images converted by a conversion method different from said 3:2 pulldown method in the successive images of said telecine image, and synchronizing again with said decided phase in conversion by said 3:2 pulldown method after inverse conversion of said detected successive images.

8. A telecine image conversion method in accordance with claim 4 further comprising the steps of:

detecting successive images converted by a conversion method different from said 3:2 pulldown method in the successive images of said telecine image, and synchronizing again with said decided phase in conversion by said 3:2 pulldown method after inverse conversion of said detected successive images.

9. A telecine image conversion method in accordance with claim 3 further comprising the steps of:

detecting successive images converted by a conversion method different from said 3:2 pulldown method in the successive images of said telecine image, and selecting an inverse conversion method registered in advance for inversely converting said telecine image to a film image with respect to said detected successive images, and converting inversely said inputted telecine image by said selected inverse conversion method.

10. A telecine image conversion method in accordance with claim 4 further comprising the steps of:

detecting successive images converted by a conversion method different from said 3:2 pulldown method in the successive images of said telecine image, and selecting an inverse conversion method registered in advance for inversely converting said telecine image to a film image with respect to said detected successive images, and converting inversely said inputted telecine image by said selected inverse conversion method.

11. A telecine image conversion method in accordance with claim 1 further comprising the steps of:

calculating said correlation values of said first and second fields by normalizing with the number of pixels of each field.

12. A telecine image conversion method in accordance with claim 2 further comprising the steps of:

calculating said correlation values of said first and second fields by normalizing with the number of pixels of each field.

13. A telecine image conversion method in accordance with claim 1 comprising the steps of:

inputting a telecine image signal being successive in time sequence, calculating the absolute value of a difference between a pixel value represented by a luminance of a pixel in a field and a pixel value in the previous field by one frame period with respect to a first field and a second field in said telecine image signal, and calculating the correlation value of said first field and the correlation value of said second field of a frame in said telecine image by calculating the sums of said absolute values in the case that said absolute values exceed a predetermined threshold value.

14. A telecine image conversion method in accordance with claim 2 comprising the steps of:

inputting a telecine image signal being successive in time sequence, calculating the absolute value of a difference between a pixel value represented by a luminance of a pixel in a field and a pixel value in the previous field by one frame period with respect to a first field and a second field in said telecine image signal, and calculating the correlation value of said first field and the correlation value of said second field of a frame in said telecine image by calculating the sums of said absolute values in the case that said absolute values exceed a predetermined threshold value.

15. A telecine image conversion apparatus comprising:

a field memory for holding a telecine image having successive plural frames each including a first field and a second field, plural correlation value calculation circuits for calculating the absolute value of a difference between a pixel value representing a luminance of a pixel in a field of a telecine image and a pixel value in the previous field by one frame period from the image held by said field memory, and outputting correlation values of the fields in said telecine image by summing said absolute values in the case that said absolute values exceed a predetermined threshold value, plural comparison circuits for comparing said correlation values output from said correlation value calculation circuits with a reference value, and determining the image of each field as a duplicated field in the case that said correlation value is smaller than said reference value, and a control unit for controlling input and output of an image with respect to said field memory, and converting inversely the inputted telecine image on the basis of comparison results of said comparison circuits.

16. A telecine image conversion apparatus comprising:

a field memory for holding a telecine image having successive plural frames each including a first field and a second field, plural correlation value calculation circuits for calculating the absolute value of a difference between a pixel value representing a luminance of a pixel in a field of a telecine image and a pixel value in the previous field by one frame period from the image held by said field memory, and outputting correlation values of the fields in said telecine image by summing said absolute values in the case that said absolute values exceed a predetermined threshold value, correlation value comparison circuits for comparing the correlation values output from said plural correlation value calculation circuits with each other, and for determining the image of one field as a duplicated field in the case that a relative value of the correlation value of the other field to the correlation value of one field of the same frame exceeds a reference value, and a control unit for controlling input and output of an image with respect to said field memory, and converting inversely the inputted telecine image on the basis of comparison results of said correlation value comparison circuits.

17. A telecine image conversion apparatus in accordance with claim 15 further comprising:

a phase holding circuit for holding the comparison results of said comparison circuits as a phase in a successive fields of the telecine image, a phase synchronization circuit for detecting a head of the successive images having a period of conversion by a 3:2 pulldown method, performing phase synchronization and detecting a successive images converted by a conversion method different from said 3:2 pulldown method from phase information of said phase holding circuit, and a control unit for converting inversely by an inverse conversion method registered in advance with respect to the telecine image of the phase detected by said phase synchronization circuit.

18. A telecine image conversion apparatus in accordance with claim 16 further comprising:

a phase holding circuit for holding the comparison result of said correlation value comparison circuit as a phase in a successive fields of the telecine image, a phase synchronization circuit for detecting a head of the successive images having a period of conversion by a 3:2 pulldown method, performing phase synchronization and detecting a successive images converted by a conversion method different from said 3:2 pulldown method from phase information of said phase holding circuit, and a control unit for converting inversely by an inverse conversion method registered in advance with respect to the telecine image of the phase detected by said phase synchronization circuit.

19. A telecine image conversion apparatus in accordance with claim 15 further comprising:

a filter for limiting band widths in time and space of the image converted by the telecine image conversion apparatus in conversion of the telecine image by a telecine image conversion method for controlling an output of an image as the unit of field from the telecine image.

20. A telecine image conversion apparatus in accordance with claim 15 further comprising:

an image coding unit for coding the converted successive images.

21. A telecine image conversion apparatus in accordance with claim 16 further comprising:

an image coding unit for coding the converted successive images.

22. A telecine image conversion apparatus in accordance with claim 17 further comprising:

an image coding unit for coding the converted successive images.

23. A telecine image conversion apparatus in accordance with claim 18 further comprising:

an image coding unit for coding the converted successive images.

24. A telecine image conversion apparatus in accordance with claim 19 further comprising:

an image coding unit for coding successive images obtained through said filter.

25. A telecine image conversion apparatus in accordance with claim 15 further comprising:

an image coding unit for coding the converted successive images, and an image transmission unit for transmitting said successive images coded by said image coding unit.

26. A telecine image conversion apparatus in accordance with claim 16 further comprising:

an image coding unit for coding the converted successive images, and an image transmission unit for transmitting said successive images coded by said image coding unit.

27. A telecine image conversion apparatus in accordance with claim 17 further comprising:

an image coding unit for coding the converted successive images, and an image transmission unit for transmitting said successive images coded by said image coding unit.

28. A telecine image conversion apparatus in accordance with claim 18 further comprising:

an image coding unit for coding the converted successive images, and an image transmission unit for transmitting said successive images coded by said image coding unit.

29. A telecine image conversion apparatus in accordance with claim 19 further comprising:

an image coding unit for coding successive images obtained through said filter, and an image transmission unit for transmitting said successive images coded by said image coding unit.

30. A telecine image conversion apparatus in accordance with claim 15 further comprising:

an image coding unit for coding the converted successive images, and an image recording unit for recording said successive images coded by said image coding unit.

31. A telecine image conversion apparatus in accordance with claim 16 further comprising:

an image coding unit for coding the converted successive images, and an image recording unit for recording said successive images coded by said image coding apparatus.

32. A telecine image conversion apparatus in accordance with claim 17 further comprising:

an image coding unit for coding the converted successive images, and an image recording unit for recording said successive images coded by said image coding unit.

33. A telecine image conversion apparatus in accordance with claim 18 further comprising:

an image coding unit for coding the converted successive images, and an image recording unit for recording said successive images coded by said image coding unit.

34. A telecine image conversion apparatus in accordance with claim 19 further comprising:

an image coding unit for coding successive i mages obtained through said filter, and an image recording unit for recording said successive images coded by said image coding unit.

35. A telecine image conversion apparatus in accordance with claim 20, further comprising:

a recording medium on which said successive images coded by said image coding unit are recorded.

36. A telecine image conversion apparatus in accordance with claim 20, further comprising:

a decoding unit for decoding the successive images coded by said image coding unit.

37. A telecine image conversion apparatus in accordance with claim 25, further comprising:

a decoding unit for decoding the coded successive images transmitted by said image transmission unit.

38. A telecine image conversion apparatus in accordance with claim 35, further comprising:

a decoding unit for decoding the coded successive images recorded in said recording medium.

* * * * *